(12) United States Patent
Hedlund et al.

(10) Patent No.: US 11,554,359 B2
(45) Date of Patent: Jan. 17, 2023

(54) SUPPORTED ZEOLITE FILMS AND METHODS FOR PREPARING

(71) Applicants: Jonas Hedlund, Luleå (SE); Allan Holmgren, Luleå (SE); Liang Yu, Luleå (SE)

(72) Inventors: Jonas Hedlund, Luleå (SE); Allan Holmgren, Luleå (SE); Liang Yu, Luleå (SE)

(73) Assignee: ZEOMEM SWEDEN AB, Luleå (SE)

( * ) Notice: Subject to any disclaimer, the term of this patent is extended or adjusted under 35 U.S.C. 154(b) by 0 days.

(21) Appl. No.: 16/644,019

(22) PCT Filed: Sep. 5, 2018

(86) PCT No.: PCT/EP2018/073913
§ 371 (c)(1),
(2) Date: Mar. 3, 2020

(87) PCT Pub. No.: WO2019/048505
PCT Pub. Date: Mar. 14, 2019

(65) Prior Publication Data
US 2020/0246775 A1    Aug. 6, 2020

(30) Foreign Application Priority Data

Sep. 5, 2017  (GB) ..................... 1714269

(51) Int. Cl.
*B01J 35/06*  (2006.01)
*B01J 20/18*  (2006.01)
(Continued)

(52) U.S. Cl.
CPC ............ *B01J 20/18* (2013.01); *B01D 63/066* (2013.01); *B01D 67/0051* (2013.01); *B01D 69/105* (2013.01); *B01D 71/028* (2013.01); *B01J 20/28033* (2013.01); *B01J 29/035* (2013.01); *B01J 29/04* (2013.01); *B01J 29/06* (2013.01); *B01J 29/08* (2013.01); *B01J 29/18* (2013.01); *B01J 29/40* (2013.01); *B01J 29/60* (2013.01); *B01J 29/65* (2013.01); *B01J 29/70* (2013.01); *B01J 29/7003* (2013.01); *B01J 29/7007* (2013.01); *B01J 29/7015* (2013.01); *B01J 29/7042* (2013.01); *B01J 29/85* (2013.01); *B01J 35/0006* (2013.01); *B01J 35/065* (2013.01); *B01J 37/0215* (2013.01); *B01J 37/0217* (2013.01); *B01J 37/0219* (2013.01); *B01J 37/0221* (2013.01); *B01J 37/0225* (2013.01);
(Continued)

(58) Field of Classification Search
CPC .. B01J 20/18; B01J 20/28033; B01J 2229/64; B01J 2229/66; B01J 29/035; B01J 29/04; B01J 29/06; B01J 29/18; B01J 29/08; B01J 29/40; B01J 29/60; B01J 29/65; B01J 29/70; B01J 29/7003; B01J 29/7007; B01J 29/7015; B01J 29/7042; B01J 29/85; B01J 35/0006; B01J 35/065; B01J 37/0215; B01J 37/0217; B01J 37/0219; B01J 37/0221; B01J 37/0225; B01J 37/0228; B01J 37/0246; B01D 2323/04; B01D 2323/24; B01D 2323/40; B01D 2323/48; B01D 2323/50; B01D 2325/02; B01D 2323/022; B01D 2323/16; B01D 63/066; B01D 67/0051; B01D 67/0013; B01D 69/105; B01D 71/028; B01D 2323/46; B01D 2325/022; B01D 2325/16
USPC .. 502/4, 400, 407, 414, 415, 62, 63, 64, 69, 502/71, 77, 78, 79, 214
See application file for complete search history.

(56) References Cited

U.S. PATENT DOCUMENTS 3,702,886 A   11/1972   Argauer et al.
4,061,724 A   12/1977   Grose et al.
(Continued)

FOREIGN PATENT DOCUMENTS

WO   WO-93/08125 A1    4/1993
WO   WO-1993/001825 A1   4/1993
(Continued)

OTHER PUBLICATIONS

International Search Report and Written Opinion datd Dec. 19, 2018 by the International Searching Authority for International Application No. PCT/EP2018/073913, filed on Sep. 5, 2018 and published as WO 2019/048505 dated Mar. 14, 2019 (Applicant—Jonas Hedlund et al) (14 Pages).

(Continued)

*Primary Examiner* — Elizabeth D Wood
(74) *Attorney, Agent, or Firm* — Ballard Spahr LLP

(57) ABSTRACT

A method for producing a crystalline film comprising zeolite and/or zeolite-like crystals on a porous substrate is described. The method has the steps of: providing a porous support; modifying at least a surface of the top-layer of said porous support by treatment with a composition having one or more cationic polymer(s); rendering at least the outer surface of said porous support hydrophobic by treatment with a composition having one or more hydrophobic agent(s); subjecting said treated porous support to a composition having zeolite and/or zeolite-like crystals thereby depositing and attaching zeolite and/or zeolite-like crystals on said treated porous support, and growing a crystalline film of zeolite and/or zeolite-like crystals on said treated porous support and calcination. Crystalline films find use in a variety of fields such as in the production of membranes, catalysts etc.

13 Claims, 21 Drawing Sheets

(51) Int. Cl.

| | | |
|---|---|---|
| *B01D 63/06* | (2006.01) | |
| *B01D 67/00* | (2006.01) | |
| *B01D 69/10* | (2006.01) | |
| *B01D 71/02* | (2006.01) | |
| *B01J 20/28* | (2006.01) | |
| *B01J 29/035* | (2006.01) | |
| *B01J 29/70* | (2006.01) | |
| *B01J 29/06* | (2006.01) | |
| *B01J 29/85* | (2006.01) | |
| *B01J 29/18* | (2006.01) | |
| *B01J 29/65* | (2006.01) | |
| *B01J 29/40* | (2006.01) | |
| *B01J 29/04* | (2006.01) | |
| *B01J 29/60* | (2006.01) | |
| *B01J 29/08* | (2006.01) | |
| *B01J 37/02* | (2006.01) | |
| *B01J 35/00* | (2006.01) | |

(52) U.S. Cl.
CPC ....... *B01J 37/0228* (2013.01); *B01J 37/0246* (2013.01); *B01D 2323/04* (2013.01); *B01D 2323/48* (2013.01); *B01D 2323/50* (2013.01); *B01D 2325/02* (2013.01); *B01D 2325/16* (2013.01); *B01J 2229/64* (2013.01); *B01J 2229/66* (2013.01)

(56) References Cited

U.S. PATENT DOCUMENTS

| | | |
|---|---|---|
| 6,177,373 B1 | 1/2001 | Sterte et al. |
| 6,183,926 B1 | 2/2001 | Kuroda et al. |
| 6,689,195 B1 | 2/2004 | Anthonis et al. |
| 2002/0142242 A1 | 10/2002 | Inoue et al. |
| 2003/0228969 A1* | 12/2003 | Dong ................ B01D 67/0051 502/4 |
| 2005/0014371 A1* | 1/2005 | Tsapatsis ................ C30B 7/005 438/689 |
| 2009/0239381 A1 | 9/2009 | Nishimi et al. |
| 2010/0016619 A1 | 1/2010 | Cheng et al. |
| 2011/0160039 A1* | 6/2011 | Himeno ................ B01J 29/70 502/4 |
| 2015/0360964 A1* | 12/2015 | Rimer ................ B01J 29/7015 423/700 |
| 2016/0023187 A1* | 1/2016 | Hedlund ............ B01D 67/0051 502/64 |

FOREIGN PATENT DOCUMENTS

| | | |
|---|---|---|
| WO | WO-94/05597 A1 | 3/1994 |
| WO | WO-1994/005597 A1 | 3/1994 |
| WO | WO-94/25151 A1 | 11/1994 |
| WO | WO-1997/003019 A1 | 1/1997 |
| WO | WO-1997/003020 A1 | 1/1997 |
| WO | WO-1997/003021 A1 | 1/1997 |
| WO | WO-97/33684 A1 | 9/1997 |
| WO | WO-1997/033684 A1 | 9/1997 |
| WO | WO-2000/053298 A1 | 9/2000 |
| WO | WO-2004/080889 A2 | 9/2004 |
| WO | WO-2014/140291 A1 | 9/2014 |

OTHER PUBLICATIONS

Zhou, et al: "Ultrathin hydrophobic MFI membranes", Microporous and Mesoporous Materials, vol. 192, (2013), pp. 76-81 (Abstract).

\* cited by examiner

SUPPORTED ZEOLITE FILMS AND METHODS FOR PREPARING

CROSS-REFERENCE TO RELATED APPLICATIONS

This application is a U.S. National Phase Application of International Application No. PCT/EP2018/073913, filed Sep. 5, 2018, which claims priority to Great Britain Application No. 1714269.6, filed Sep. 5, 2017, each of which are hereby incorporated by reference in their entirety.

FIELD OF INVENTION

The present invention relates to a method for the preparation of supported zeolite films and to supported zeolite films provided by the method and in particular to a method using a pretreatment of porous substrates onto which films of zeolite may be grown.

BACKGROUND ART

Molecular sieves may be classified in various categories, for example according to their chemical composition and their structural properties. A group of molecular sieves of particular interest is the group comprising zeolites and zeolite-like materials. Zeolites and zeolite like materials may be prepared synthetically. A frequently prepared zeolite framework is the MFI framework, which has 10 T-atoms in the ring and thereby a suitable pore size for many applications. This framework can be prepared in pure silica form, i.e. the T-atoms are only silicon atoms. In this case, the structure is denoted silicalite-1. However, if some of the silicon atoms are replaced with aluminum atoms, the structure is denoted ZSM-5. U.S. Pat. No. 3,702,886 (1972) discloses a method for preparing crystalline ZSM-5 zeolite with Si/Al ratios between 2.5 and 50. Since then, MFI zeolites with higher ratios have been claimed in the Patent literature. Higher Si/Al ratio implies a less hydrophilic structure whilst silicalite-1 has a hydrophobic characteristic (U.S. Pat. No. 4,061,724 (1977)). Templates or structure directing agents are added to the reaction mixture in the synthesis of zeolites and zeolite like materials to direct the crystallization to the desired framework. For example, tetrapropyl ammonium hydroxide is often used as a template in the synthesis of MFI zeolite.

There are numerous methods described in the art for the manufacture of supported materials for inorganic catalysts and thin membranes. Supports coated with thin zeolite films find their applications in for example the fields of membrane separation, sensor technology, catalysis, electrochemistry, and ion exchange.

Methods of preparing supported zeolite films on porous supports using hydrothermal synthesis techniques and the resulting supported zeolite films have and exhibit a number of severe problems. Firstly, species from the synthesis solution used for growth of the zeolite materials may invade and be deposited within the porous support, resulting in reduction of support porosity, which is demonstrated by the reduced permeation of gas or liquid molecules through the complete structure (support+zeolite film). Secondly, the support material may not be inert under the synthesis conditions used, resulting in dissolution of atoms from the support to an unacceptable degree and these atoms may then interfere with the intended structure of the zeolite. Thirdly, in cases where calcination is preferred to remove a structure-directing agent from the synthesized film, the invaded and deposited species in the support may lead to crack formation in the film and the support due to differences in thermal expansion properties of the zeolite film and the support.

Various attempts have been made in the art to solve these problems, none of which are totally satisfactory or introduce other problems and challenges.

WO94/25151 and Gavalas et al. "Use of diffusion barriers in the preparation of supported zeolite ZSM-5 membranes", Journal of Membrane Science, 126 (1997), 53-65, describe the use of a barrier layer that prevents water in the aqueous coating suspension used from entering the pores of the support to an extent such that the silica and zeolite particles form a thick gel layer on the support. The barrier layer may be temporary or permanent; temporary barrier layers were fluids such as water or glycol. These methods are complex and do not produce satisfactory supported zeolite layers.

WO97/33684 discloses a method for producing a crystalline film comprising silicalite-1 crystals on a porous α-alumina substrate comprising modifying the surface of said substrate by reacting it with a water soluble cationic polymer (Berocell 6100), thereby rendering the surface of the support positively charged and consequently hydrophilic. Subsequently, microcrystals of silicalite-1 are attached onto the substrate having a surface charge opposite to the charge of the microcrystals, and eventually a crystalline film was allowed to grow on the support by hydrothermal crystallization. No measures to reduce invasion of zeolite into the pores of the substrate were disclosed.

WO 2004/080889 discloses methods for producing crystalline membranes comprising zeolite MFI crystals on a porous α alumina ceramic substrate that has been modified by coating with mesoporous silica and subsequently with a silane coupling agent (3-chloropropyltrimethoxysilane), then coating the modified surface with MFI seed crystals, and eventually growing a crystalline film by hydrothermal crystallization. No measures to reduce invasion were disclosed.

In WO 00/53298, there is described a masking technique involving polymers such as polymethylmethacrylate (PMMA) and the filling of the support with paraffin wax, with removal of the PMMA and attachment of a cationic polymer onto the bare exposed substrate surface. This is a rather time consuming and practically complicated procedure. However, a significant drawback with this masking procedure is not only the time required to mask a substrate, but also the depth precision and masking efficiency. In addition, the method is difficult to apply on supports with complex geometries, such as multi-channel tubes needed in practical applications. This method results in incomplete filling of the support with wax and subsequent invasion of species from the synthesis solution and/or film growth into the support pores during hydrothermal synthesis. A further problem associated the partial invasion of the synthesis solution in the support is the fact that the conditions required for synthesizing numerous zeolite framework films are so severe that the substrate is partly dissolved or etched. Accordingly, aluminum may be dissolved from the top layer of a non-masked or incompletely masked α-alumina substrate leading to a zeolite structure that was not intended to be produced. Another problem with this masking concept is the lack of control of the thickness of the synthesized membrane, since the invasion of species from synthesis solution may vary between different synthesized films/membranes as well as between different parts of the same film/membrane.

WO2014140291 discloses a method for producing a crystalline film comprising zeolite and/or zeolite-like crystals on a porous α-alumina substrate comprising first making the porous support hydrophobic with hydrophobic agent(s) and then modifying the hydrophobic surface with amphiphiles and/or cationic polymers before deposition of microcrystals of silicalite-1 onto the support. Subsequently a crystalline film was grown on the support by hydrothermal treatment. Whilst generally satisfactory results may be obtained with this method, uneven coverage of amphiphiles and/or cationic polymers on the hydrophobic support will result in uneven coverage of silicalite-1 microcrystals on the support and cause membrane defects during membrane synthesis.

Accordingly, there is still a need in the art to produce films and membranes which avoid or minimizes the problems mentioned above associated with known procedures for preparing films comprising zeolite crystals on porous supports. There is also a general need in the art to provide alternative methods for the manufacture of supported films of zeolite crystal especially those using pretreatment of porous supports onto which subsequently seed crystals are to be deposited. There is also a need in the art to produce membranes with low amount of defects, high permeance through the final product with high reproducibility and negligible leaching of atoms from the support.

DISCLOSURE OF THE INVENTION

The problems in the art have now been overcome or at least mitigated by the present invention by presenting a new method allowing to prepare thin zeolite films on porous or non-porous supports, which avoids or reduces invasion of the porous support, simultaneously provides for a minimization of defects in the final zeolite film product, improves reproducibility and permeability of synthesized zeolite membranes.

It has surprisingly been found that if the support is treated and prepared in a certain fashion that the resultant supported zeolite films are of advantageously high quality. It has been found that if the support is chemically modified in a specific way before zeolite crystal deposition and subsequent hydrothermal zeolite film synthesis, then crystalline films comprising zeolite crystals are produced with properties, which hitherto have not been achieved.

The invention provides for a new and improved method of pretreating a support before deposition of seed crystals thereon. The key steps are that the support is charge modified preferably by treatment with a charge modifying agent such as for example a cationic polymer, before the support is made hydrophobic in advance of zeolite crystal deposition and subsequent hydrothermal crystalline zeolite film synthesis.

A new and improved method disclosed herein results in almost no defects, high permeability, high reproducibility, and negligible leaching of atoms from a support, properties of zeolite membranes that together surpass previously achieved results. High reproducibility is a necessity in the production of large numbers of membranes needed for industrial applications. The method also enables preparation of tubular membranes and membranes with a complex geometry, which are a necessity for industrial applications.

The surface modification methods or pretreatment methods as provided in the present invention are particularly suitable for porous solid supports, but may also be used for nonporous supports or substrates.

Accordingly, the present invention provides a method for producing a substrate or porous support for deposition of a crystalline film comprising zeolite and/or zeolite-like crystals, said method comprising the steps of:

a) charge modifying a substrate or porous support, and
b) then rendering the charge modified substrate or porous support hydrophobic.

Accordingly, the present invention also provides a method for producing a crystalline film comprising zeolite and/or zeolite-like crystals on a substrate or porous support, said method comprising the steps of:

a) charge modifying a substrate or porous support,
b) then rendering the charge modified substrate or porous support hydrophobic,
c) depositing particulate zeolite and/or zeolite-like crystals onto the charge modified and hydrophobic substrate or porous support, and
d) growing a crystalline film comprising zeolite and/or zeolite-like crystals from said deposited particulate zeolite and/or zeolite-like crystals to provide a crystalline film comprising zeolite and/or zeolite-like crystals on a substrate or porous support.

It is preferred in the methods of the present invention that the substrate or porous support is charge modified to have a positive charge. It is preferred that the substrate or porous support is charge modified through use of a chemical treatment of the substrate or pororus support. Most preferably the substrate or porous support is charge modified by treatment with a composition comprising one or more cationic polymer(s).

It is preferred that the charge modification of the substrate or porous support is controlled so that at least the top layer and/or top surface of the porous support is charge reversed. In this context the top layer of the substrate or porous support is considered to be a defined region proximate to or at the surface upon which the zeolite crystals and subsequent zeolite film may be located. This may for example be at the outer surface of the fine pore top layer in an asymmetric porous support.

It is preferred that the charge modified substrate or porous support is rendered hydrophobic by treatment with a composition comprising one or more chemicals that render the support hydrophobic such as for example hydrophobic agent(s). The rendering of the substrate or porous support hydrophobic may be referred to as hydrophobization. In one embodiment, the hydrophobization of the substrate or porous support is as described in WO2014140291, the disclosure of which in so far as it relates to manufacture of a hydrophobic surface is incorporated by reference.

The present invention also provides a substrate or porous support which is obtainable by the method of the present invention.

The present invention also provides a substrate or porous support comprising substrate or porous support material with a first layer of deposited charge modifying material and a second layer of hydrophobic agent(s).

The present invention also provides a crystalline film on a substrate or porous support, comprising a substrate or porous support material with a first deposited layer of charge modifying material, a deposited layer of hydrophobic agent and a crystalline zeolite and/or zeolite-like film hydrothermally grown from zeolite and/or zeolite-like seed crystals.

The present invention also provides a crystalline film, comprising zeolite and/or zeolite-like crystals, which is obtainable by a method of the present invention.

The present invention also provides an article membrane, catalyst, sensor, adsorbent, and/or an electrode comprising a crystalline film according to the present invention.

The supports, which may serve as substrates for the films, may be substances with any porosity or are porous supports with a well-defined and regular porosity as well as supports with natural or synthetic porosity. Films as produced herein find use in the fields of membrane separation, sensor technology, catalysis, electrochemistry, and/or ion exchange.

A support used in a method as provided herein may be selected from a group comprising or consisting of glass, sintered metals, metal alloys, steel, nickel, silicon, noble metals, carbon, polymers, inorganic oxides, alpha-alumina, gamma-alumina, titania, zirconia, silica, alumina/zirconia mixture(s), aluminum silicates, cordierite, zeolite or zeolite-like materials, silicalite-1, zinc sulphide. A porous support may also be a fibrous material such as glass fibers, ceramic fibers, carbon fibers, graphite fibers, cellulose fibers, metal fibers, as well as various polymer fibers. All supports may be produced by methods known in the art.

An example of a porous support for use herein comprises circular discs of porous α-alumina (25 mm in diameter, 3 mm thick), comprising a 30 μm thick top layer of 100 nm pores and a 3 mm thick base layer with 3 μm pores. Such a support having layers of differing pore dimensions may be referred to as an asymmetric support. However, a method as provided herein is well suited for support materials with a complex geometry, such as tubular supports or multi-channel tubes or honeycombs. An example of a porous tubular support for use herein comprises a tube of porous α-alumina (100 mm in length, an outer diameter of 10 mm, and an inner diameter of 7 mm), comprising a 30 μm thick top layer of 100 nm pores and a 1.5 mm thick base layer with 3 μm pores.

Another example of a porous tubular support for use herein comprises a tube of porous α-alumina (500 mm in length, an outer diameter of 10 mm, and an inner diameter of 7 mm), comprising 30 μm layer of 600 nm pores in between a 30 μm thick top layer of 100 nm pores, and a 1.5 mm thick base layer with 3 μm pores.

A porous support may comprise pore sizes from the nanometer to the micrometer range, such as from 0.9 nm to 10 μm. The support may be multilayered; for example, to improve the mass transfer characteristics of the support, only the surface region of the support in contact with the layer or monolayer of seed crystals may have small diameter pores, while the bulk of the support, toward the surface remote from the top-layer, may have large diameter pores. These may be referred to as asymmetric porous supports, where there is an asymmetry of pore diameter from the top surface or layer to the bottom surface or layer of the support.

Examples of nonporous supports for coating with zeolite and/or zeolite-like films include solid silicon wafers, quartz, aluminum oxide, germanium, diamond, zinc sulphide, zinc selenide, zirconium dioxide, aluminum silicate and precious metals. Such supports may be used in the field of sensor technology. Said zeolite and/or zeolite-like crystal may be selected from the group comprising silicalite-1, zeolite A, zeolite Beta, the zeolites L, Y, X, ZSM-25, ZSM-22, ZSM-11, ZSM-5, ZSM-2, LTA, SAPO-34, DDR, mordenite, chabazite, sodalite, ferrierite and phillipsite but is not limited thereto. Further examples thereof are also provided herein.

When using the method of the present invention, and when using a porous support, said porous support will remain porous even after the surface of the support material has been rendered hydrophobic. This is different from other methods used in the art (except for WO2014140291), such as when a support is masked with wax. Further, in the present invention close to the entire support material is protected, and especially the most critical part of the support material i.e. the top layer or top surface of the material containing small pores which previously have been difficult to completely protect using prior masking methods. Without wishing to be bound by theory, this may be due to the fact that it is more difficult for viscous fluids used in masking procedures to enter very small pores than much larger pores and this difficulty should increase with decreasing pore size. In addition, a top layer of a support with an average pore size of e.g. 100 nm also contains pores much less than 100 nm.

Furthermore, the deposition of seed crystals onto the hydrophobic surface associated with the support in the present invention is different from previous methods known in the art (except for WO2014140291), since the deposition presented herein is a deposition of hydrophilic seed crystals onto a hydrophobic surface associated with a support, which has already been charge modified in a step before the hydrophobization. It is surprising that the hydrophilic seed crystals are not only attracted towards the hydrophobic surface but that they also remain securely attached for subsequent use in hydrothermal synthesis. This behavior is counter intuitive.

Before a substrate or support is used in the processes of the present invention it is preferred that it is calcined and/or washed with a suitable solvent such as for example acetone. This step is to ensure when desirable that the support is purified from possible contaminants. During calcination, when used, the support, e.g. α-$Al_2O_3$, is slowly heated from room temperature to about 500° C. At such a temperature, the support is allowed to calcinate for about 6 h, where after it is cooled to room temperature. Heating and cooling takes about 6 h, respectively. This procedure is performed so that any organic residues will be removed from the support and is a procedure, which is used in the art.

Calcination may also be performed at the end of the method of the present invention when there is a film of crystalline zeolite.

It is preferred that these are the only instances of calcination that are used in the process of the present invention; thus at the completion of each of steps (a), (b) or (c) the product of each stage is moved to the next stage of the process without being calcined. This ensures that the final product of step (c), just before it is used in step (d) the growing a crystalline film, has retained its required hydrophobic properties. Calcination at any of stages (a) to (c) will destroy this required property.

In the methods of the present invention, the porous support may be impregnated with solvent before charge modification; this may be achieved by filling the pores of a porous support with a solvent, solution, or a composition thereof; such as water, an alcohol such as ethanol, propanol, iso-propanol or butanol, an aqueous ammonia solution or a combination thereof. These materials may be and preferably are removed prior to the hydrophobization step. The methods of the present invention may alternatively also utilize a masking procedure using more viscous materials to mask the high porosity regions of the support prior to charge modification of the top-layer. Such masking materials may be and preferably are removed prior to the hydrophobization step. In this way with either impregnation or masking it is possible to localize the charge modification to just the top-layer and/or top surface of the support especially when an asymmetric support is utilized.

In the methods of the present invention provided herein it is preferred that charge modification of the substrate or porous support is achieved through the treatment of the substrate or pororus support with a cationic material. By cationic material is meant any material, which may be deposited upon the surface of a support or porous substrate to provide a positive charge to the substrate or porous support. It is preferred that the cationic material is of a composition and of sufficient molecular weight that it is retained deposited upon the substrate or porous support after subsequent washing steps to remove excess cationic material or cationic material containing deposition solution. It is preferred that the cationic material is a zwitterionic molecule or cationic polymer and most preferably is a cationic polymer, such as polymers with various charge densities and molecular weights. A cationic polymer may have a repeat unit such as a quaternary amine with hydroxyl groups in the main chain. An example of such a polymer is poly(dimethylamine-co-epichlorhydrin-co-ethylenediamine) with a repeat unit $[CH_2CH(OH)CH_2N(CH_3)_2]^{n+}$ and a molecular weight of 75,000 g/mol, marketed by Sigma-Aldrich. Further examples of suitable cationic polymers are: e.g. poly (diallyl dimethylammonium chloride) and polyethyleneimine.

The cationic material is preferably deposited from a solution or dispersion of the cationic material in a suitable solvent. Ideally, the surface tension of the solution or dispersion is such that it may wet at least the top surface of the porous support and when present impregnate and wet the top-layer of the porous support. An aqueous ammonia solution comprising cationic polymer(s) may be a solution with pH value of 7, 8, 9, 10, 11, 12 or any pH value inbetween these values, such as 7.4, 8.5, 9.4, 10.5, or 11.4.

The charge modified support is preferably washed with a suitable solution, solvent or mixture to remove excess cationic material or cationic material containing solution or dispersion. One suitable and preferred washing agent is an ammonia solution. After washing it is preferred that the charge modified substrate or support is dried.

The charge modified substrate or porous support is preferably rendered hydrophobic by treatment with materials that are capable of making the surfaces of the substrate or porous support hydrophobic. It is preferred that the step of rendering a charge modified porous support hydrophobic is undertaken on a porous support with all of its pores open and unmasked or impregnated. Thus, the hydrophobization may and preferably does occur on all internal and external surfaces of the porous support.

Compounds or agents are referred to herein as hydrophobic agent(s) when used for rendering a surface of a porous support hydrophobic.

The hydrophobic agent(s) may be any hydrophobic agent(s) which substantially remains at the support surface during subsequent process steps e.g. deposition of seed crystals or film growth under hydrothermal synthesis conditions, and which is substantially stable under such process conditions, preferably during the time of the process.

The hydrophobic agent may comprise one or more of the following: hydroxamate(s), fluorinated alkyl silanes, perfluorinated alkyl silanes, alkoxy silanes, chloro silanes, dialkyl silanes, phenylalkyl silanes, substituted phenylalkyl silanes or a combination thereof.

The hydrophobic agent may be selected from but not limited to, octylhydroxamate, decylhydroxamate, dodecylhydroxamate, cetylhydroxamate, dialkyl dichlorosilanes, such as methyloctyl dichlorosilane, decylmethyl dichlorosilane, dodecyl methyl dichlorosilane, and octadecyl methyldichlorosilane; triethoxypropylsilane, phenyltrimethoxy silane; or the alkyl alkoxysilanes, such as octyltrimethoxysilane, decyl trimethoxysilane, dodecyl triethoxysilane, octadecyltrihydrosilane, and cetyl triethoxysilane, or the partially fluorinated or fluorinated alkyl silanes for example, 1H,1H,2H,2H-Perfluorodecyltriethoxysilane, 1H,1H,2H, 2H-Perfluorodecyltrichlorosilane, 1H,1H,2H,2H-Perfluorododecyltriethoxysilane, 1H,1H,2H,2H-Perfluorocetylmethyldichlorosilane, 1H,1H,2H,2H-Perfluorooctyltrimethoxysilane, 1H,1H,2H,2H-Perfluorododecyltriethoxysilane, or a combination thereof.

The hydrophobic agent may be dissolved in a non-aqueous solvent such as ethanol, propanol or any other alcohol, and the low viscosity of the solution makes it possible for the solution to enter into all or at least most of the pores of the support, which is thereby rendered hydrophobic. Hydrophobization is achieved by immersing the substrate or porous support into a solution or dispersion of the hydrophobic agent.

After the hydrophobization step, the hydrophobized substrate or porous support may be washed with a solution or solvent to remove excess hydrophobic agent or hydrophobic agent solution/dispersion. Subsequent to this washing stage, which may preferably be carried out with an alcohol such as for example ethanol, the treated substrate or porous support is dried.

In the methods as provided herein, the charge modified, and hydrophobic support may be hydrophobic on any surface directly or indirectly facing zeolite. Still, some surfaces of the substrate or porous support may not be rendered as hydrophobic, such as a glazing covering both ends of a porous tubular support. Hence, when it is referred to "at least a part of a surface is rendered hydrophobic" or "rendering at least the outer surface of said porous support" or "rendering at least a part of said porous substrate hydrophobic", this still means that a surface of a porous support fulfills the criteria for being hydrophobic and not allowing virtually any invasion of pores of a support, as previously defined herein. Hence, this may also be referred to as rendering the surface of a support, i.e. a porous or non-porous support hydrophobic, to which surface zeolite crystals are to be directly or indirectly adhered. Examples of rendering a surface hydrophobic are provided in the experimental section.

As a first step in the growing of a crystalline zeolite film, seed crystals are deposited upon the charge modified and hydrophobic substrate or porous support. These are usually provided usually in dispersion to the substrate or porous substrate, to form a layer, such as a monolayer, or multilayer of crystals thereon. The layer or monolayer comprising seed crystals is in a second step brought in contact with a synthesis mixture containing all the raw materials or starting materials needed for growth of the seed crystals to a film of the desired framework structure. The seeding and growth of the crystals occurs on a hydrophobic substrate or porous support. Hence, in a first step, a layer or monolayer or multilayer of zeolite crystals is formed, which may be seen as an intermediate product in the formation of the final crystalline zeolite film. This intermediate product may have utility in its own right as a catalytic layer and the present invention provides in one aspect for a treated support comprising such a layer and a process for making such a supported layer. The process of the present invention provides good quality monolayers, sub-monolayers, sub-bilayers, bilayers or multilayers of crystalline zeolite seeds, preferably good quality monolayers.

In the preferred process of the present invention this layer or monolayer or multilayer of zeolite seeds is then allowed to grow or used to grow into a film by hydrothermal treatment. Accordingly, the intermediate seed based product is then within the final supported crystalline zeolite film.

The zeolite crystals used herein as seeds may refer to crystals with a length of less than 1000 nm, such as less than 500 nm, such as less than 200 nm, such as less than 100 nm, but is not limited thereto, the length of which can be identified by using Scanning Electron Microscopy. The crystals may be prepared by any suitable method known in the art, such as a method as disclosed in International Application PCT/SE93/00715 published as WO 94/05597. This document describes a method whereby it is possible to synthesize colloidal suspensions of discrete molecular sieve microcrystals suitable for use in the preparation of monolayer structures. Molecular sieves such as zeolites or crystalline microporous metal silicates are generally synthesized by hydrothermal treatment of a silicate solution with a well-defined composition. This composition, as well as the synthesis parameters such as temperature, time and pressure, determines the type of product and the crystal shape obtained.

Suitable seed crystals may be prepared in accordance with a method as presented in WO 93/08125, or other methods known to those skilled in the art. Representative of molecular sieves (zeolites) which may be used include but are not limited to those of structure types AFI, AEL, BEA, CHA, SAPO-34, EUO, FAU (includes zeolite X and zeolite Y), FER, KFI, LTA, LTL, MAZ, MOR, MEL, MTN, MTT, DDR, MTW, OFF, TON zeolite beta, sodalite, ferrierite, phillipsite, and especially MFI zeolites. MFI zeolites with Si/Al ratios greater than 200 are herein referred to as silicalite-1. Some of the above materials, while not being true zeolites are frequently referred to in the literature as such, and the term zeolite will herein be used broadly to include such materials.

Further, a starting material for producing seeds of zeolite crystals and for subsequent growth of the seeds to a film may be selected from any compound(s) which is/are sufficiently reactive to produce a framework structure as previously mentioned herein. Examples of suitable silicon sources for producing a zeolite crystal are for example silicon alkoxides, hydrated silicates, precipitated silica powders, fumed silica, and colloidal silica sols. Suitable aluminum sources are aluminium alkoxides, such as aluminium isopropoxide, aluminium metal, and aluminates. Further examples of starting materials are monomeric forms of silicon such as tetraethyl orthosilicate and monomeric forms of aluminium such as aluminium isopropoxide. As an example, a synthesis mixture to form a zeolite and/or zeolite-like crystal is described in International Application WO93/08125. In that process, a synthesis mixture is prepared by boiling an aqueous solution of a silica source and an organic structure directing agent in a proportion sufficient to cause substantially complete dissolution of the silica source. The organic structure directing agent, if used, is advantageously introduced into the synthesis mixture in the form of a base, specifically in the form of a hydroxide, or in the form of a salt, e.g., a halide, especially a bromide or fluoride. Mixtures of a base and a salt thereof may be used, if desired or required, to adjust the pH of the mixture. If a base is used as structure directing agent, the pH of the mixture may advantageously be adjusted to near neutral by the addition of HF. Other methods for producing crystals are e.g. described in PCT/EP96/03096, PCT/EP96/03097, and PCT/EP96/0309698.

The zeolite crystals may be produced by the hydroxide route or the fluoride route, or a combination thereof. Such methods are known in the art.

The zeolite crystals may be present in a dispersion when deposited and attached to a surface of the treated substrate or porous support. When deposited is referred to in the present context this includes any kind of provision of the zeolite crystals or the dispersion contacting them to the support in question such as by immersing, dipping or the like of a support in crystals or a dispersion containing crystals, or the pouring of a dispersion containing said crystals onto said support. Further, a support such as a porous support may be fully or partly immersed or dipped into a solution or dispersion in a method provided herein. In the present context, synthesis mixture, dispersion or the like is used interchangeably.

The process of the present invention provides for good quality zeolite seed layers on a substrate or porous support. A dense layer of microcrystals deposited on a substrate or porous support surface is important for the growth and inter-growth of a crystalline zeolite film such as a membrane film. If the microcrystals were deposited as a sparsely sub-monolayer, the growth and inter-growth of the crystalline zeolite would provide a thicker zeolite film. A thicker zeolite film would impair the permeation of gas and liquid molecules through for example a membrane. A thinner film would not be inter-grown and suffer from defects, such as grain boundary defects The procedure to hydrothermally grow a film from the seed crystals is well-known from prior art and is therefore only described briefly herein. In the method as provided herein growth of crystalline zeolite film may be performed by bringing a support comprising a layer of zeolite crystals, into contact with a synthesis solution, gel, or a dispersion, or the like comprising starting material(s) for preparing zeolite crystals to produce the intended framework structure chemically, and any structure-directing agent needed for the synthesis. Thereafter, said zeolite crystals are allowed to grow into a structure, e.g. a crystalline film as provided herein. The treatment may be carried out in for instance a Teflon lined autoclave until an about 500 nm thick film is formed, which may require about 70 hours at 88° C. for zeolite films based upon $OH^-$ as mineralizing agent.

Because of said hydrophobicity of the porous support, the synthesis solution will not penetrate at all, or at least only to a limited extent penetrate into the pores of the porous support and accordingly little or no invasion of dissolved species from synthesis solution will occur that form an amorphous and/or crystalline phase in the pores of the support. Invasion of the support will reduce the permeability of the material, since the porosity of the support is typically 40% or less. The method as provided herein facilitates the synthesis of well-defined thin zeolite films on support surfaces with little or no invasion, which facilitates the control of the film thickness as well as the performance of the synthesized membrane in all possible applications, such as in selective separation processes, catalytic membrane reactors, selective chemical sensors, selective electrochemistry, and in the preparation of membranes from zeolite and zeolite-like crystal.

The method of the present invention provides that hydrothermal treatment of said crystals results in the growth of a thin zeolite film, with a thickness of for instance 500 nm on the support surface incorporating the (mono)layer of tightly packed zeolite crystals. The method provides an intergrown thin zeolite film firmly attached to a support via a layer or a monolayer of firmly attached zeolite crystals. The crystalline film comprising zeolite deposited on a porous support is characterized in that the pores of the porous support are free from invading species such as silica. The resulting supported crystalline zeolite film may be a composite anisotropic membrane comprising said crystalline film comprising a crystalline zeolite film deposited on a porous support.

The methods of the present invention are particularly useful to produce thin films with a controlled thickness and minimum invasion on porous supports. By thin film is meant a film with an average thickness of less than about 10 μm, such as less than about 1 μm, such as about 0.5 μm.

A "zeolite and/or zeolite-like crystal" as prepared and referred to herein, do not comprise an easily definable family of crystalline solids but may be a crystal of any of the framework types approved by the Structure Commission of the International Zeolite Association (http://www.iza-structure.org/). Such zeolites have the characteristics of large internal pore volume, molecular-size pores, regularity of crystal structure, and a diverse framework chemical composition making them highly active and selective catalysts, adsorbents, ion exchangers, and molecular sieves [J. D. Sherman. Proc. Natl. Acad. Sci. USA. 2000 May 23; 97(11); 6236.] The term crystal as referred to herein also refers to all synthetic crystals of zeolites and zeolite-like materials of any of the framework types approved by the Structure Commission of the International Zeolite Association (http://www.iza-structure.org/). Representative of zeolite and/or zeolite-like crystals which may be produced by a method as disclosed herein include but are not limited to those of structure types AFI, AEL, BEA, CHA, EUO, FAU, FER, KFI, LTA, LTL, MAZ, MOR, MEL, MTN, MTT, MTW, OFF, SOD, TON, and especially MFI zeolites. Further examples falling within the above frameworks include silicalite-1, TS-1, ZSM-5, and the zeolites sodalite, A, Beta, L, Y, X, ZSM-22, ZSM-11, ZSM-2, and SAPO-34. Some of the above materials, while not being true zeolites are frequently referred to in the literature as such, and the term zeolite will herein be used broadly to include such materials. Further, whenever a crystal, the crystals or the like is referred to herein, this is of course intended to refer also to a plurality of crystals of a framework type as defined herein. The crystals herein may also be referred to as microcrystals. In this application for brevity the term zeolite when used also encompasses "zeolite-like".

Zeolites and zeolite-like materials are microporous solids with a very regular pore structure of molecular dimensions. The dimensions of the channels control the maximum size of the molecular or ionic species that can enter the pores of a zeolite. The aperture of the channels are conventionally defined by the ring size, where, for example, the term "8-ring" refers to a closed loop that is built from 8 T-atoms and 8 oxygen atoms. Zeolites and zeolite like materials have a porous structure that can accommodate a wide variety of cations, such as $Na^+$, $K^+$, $Ca^{2+}$, $Mg^{2+}$ and others. These positive ions can readily be exchanged, which explains why zeolites can serve as ion exchangers.

A support as used in the present invention may be porous or non-porous and may also be referred to as a substrate material and will typically, and preferably form part of the final product which is produced. There may be applications where the initial substrate used in the manufacture of the cryststalline zeolite film is removed after synthesis to provide a free-standing crystalline zeolite material.

A "porous support" is a support used to provide mechanical stability for producing thin crystalline films as presented herein, wherein said support comprises a certain porosity. These porous supports usually comprise two or more distinct layers. The fine-grained thin top layer of a porous support usually exhibits pore sizes between about 1 to 1000 nm and supports the zeolite film, whereas the coarse-grained thick bottom or base layer has larger pores often in the micrometer range, such as 1 µm to 10 µm, such as 3 µm. The pore sizes of a support advantageously cause a low pressure drop while still providing mechanical stability to the membrane. Surface modification(s) of a support presented herein may be performed to any suitable porous or non-porous support(s).

A "crystalline film" referred to herein, is a crystalline structure characterized by exhibiting an X-ray diffraction pattern characteristic of the synthesized framework structure.

A "hydrophobic surface" referred to herein, is a support surface exhibiting a static contact angle of 90° or more at the three-phase contact line where a water droplet, support/substrate, and vapour phase meet. Static contact angle can be measured using a FibroDat 1121/1122 system equipped with a Charge Coupled Device (CCD) camera. Preferably water droplets with a volume close to 4 µL are used.

The term "monolayer" in the present context refers to a one crystal thick layer comprising discrete crystals, which are deposited on a support. The crystals and other materials if present may be closely packed to provide a classical monolayer. Alternatively, the crystals and other materials if present are not closely packed and therefore are present as a sub-monolayer. The exact packing density required depends to a certain degree on the nature of the crystals and the desired film to be grown from these crystals. The packing density of crystals in the monolayer should in any event be such as to enable a thin layer of a zeolite film to be grown and intergrown from the crystals. However, the method as disclosed herein is not limited to deposition of only a sub-monolayer or monolayer, since films also can be grown from sub-bilayers, bilayers, or multilayers.

The terms "attach", "attaching" and "attachment" in the present context refers to an attractive interaction between a crystal and a charge modified hydrophobic substrate or porous support.

In this document, the terms "top layer" refers to the fine-grained layer of a porous support usually exhibiting pore sizes between about 1 nm to 1000 nm and supports the zeolite film. The term "top surface" refers to the substrate or porous support surface upon which zeolite crystals are deposited.

The term "invasion" refers to unwanted deposition of material in the pores of the porous support. The material may be amorphous or crystalline material originating from the synthesis solution or originating from other sources. The seed crystals may grow into the pores of the support, which results in invasion of the support by crystalline and/or amorphous material. Ideally, the film should only coat the outermost part of the support and the pores of the support should be fully open, i.e. the invasion of the support should be minimal.

The term "permeance" referred to in the present context is defined by the unit: $10^{-7}$ mol/(m²·s·Pa).

The term "defects" referred to in the present context may be intercrystalline pores between adjacent grains, pinholes, cracks, broken intracrystalline Si—O—Si bonds or a combination thereof. Defects were measured by permporometry as described in [Permporometry analysis of zeolite membranes, Journal of Membrane Science 345 (2009) 276].

Herein, the terms "dispersion", "solution" and "mixture" may be used interchangeably and refers to one or more compound(s), which are present in an aqueous or non-aqueous solution/mixture/dispersion.

The terms "membrane" and "film" as referred to herein, may be used interchangeably and refer to a barrier having separation properties, for separation of fluid mixtures such as mixtures of gases, liquids or mixtures thereof.

In this document, the terms "structure", "article" and "object" are used interchangeably.

In this document, nm stands for nanometer and mm stands for millimeter.

It should be noted that all examples mentioned herein of materials, concentrations and any ranges or the like are applicable to all aspects of the invention even if not specifically mentioned.

EXPERIMENTAL SECTION

Example 1

Figure 1:
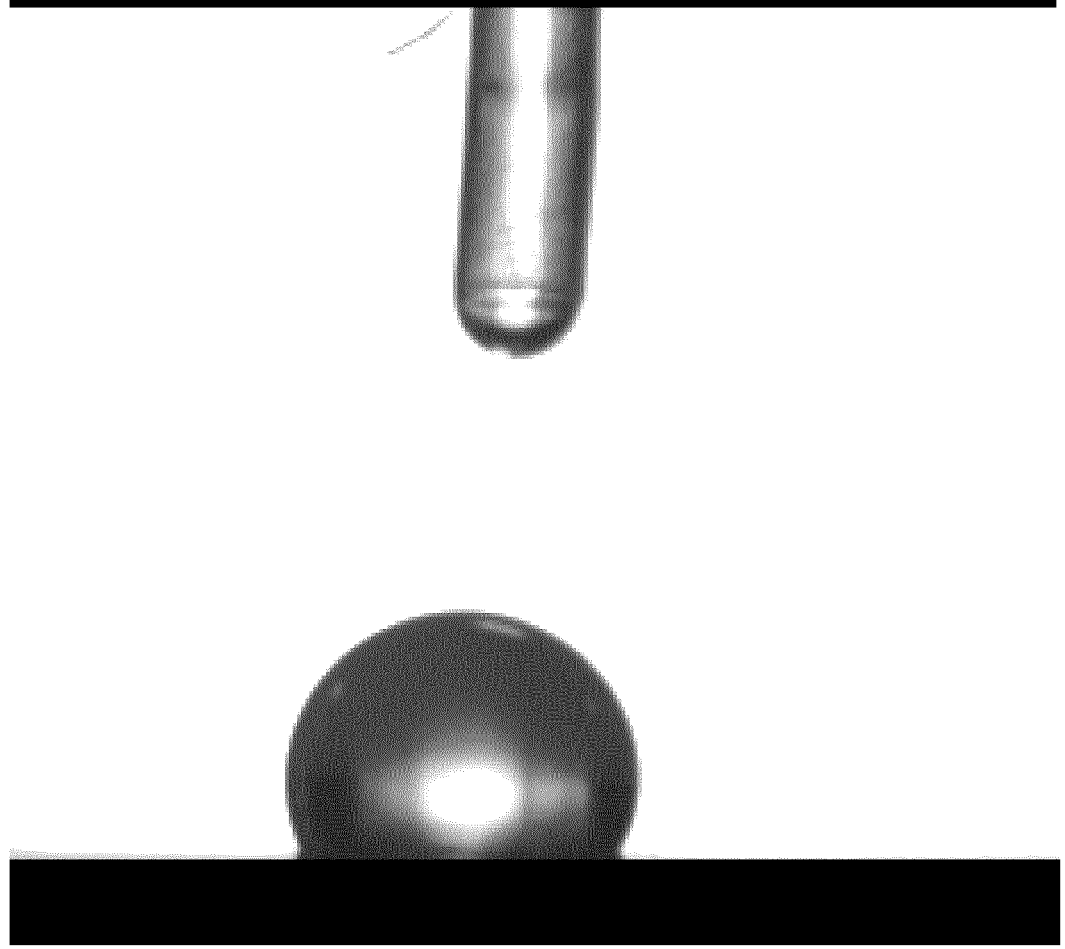
FIG. 1. A CCD (charge coupled device) camera image of a water droplet on a top layer of a porous α-alumina support surface modified according to a new and improved method described in the present invention (Example 1). The measured contact angle is 116°.

A circular disc support of porous α-alumina (25 mm in diameter, 3 mm thick), provided with a 30 μm thick top layer of 100 nm pores and a 3 mm thick base layer with 3 μm pores was calcined in air at 500° C. for 5 hours to remove any organic substances that might affect the interaction between α-alumina and chemicals used in subsequent steps. The porous support was filled with filtered distilled water by immersion and then the support was treated with filtered aqueous cationic polymer (poly(dimethylamine-co-epichlorohydrin-co-ethylenediamine), 1 wt.-% in water, pH 8) solution for 30 minutes. After 30 minutes in the aqueous polymer solution, the support was rinsed 4 times with a 0.1 M aqueous ammonia solution and subsequently, after drying in oven for 2 hours at 105° C., the support was immersed into a 2.5 wt.-% ethanol solution of 1H, 1H, 2H, 2H-perfluorodecyltriethoxysilane for 1 hour. Subsequently, the support was dipped into ethanol (99.7%) four times after which the ethanol was replaced by new ethanol. This procedure was repeated six times. After drying in oven for 2 hours at 105° C., the contact angle between a droplet (4 μL) of milliQ water and the disc support was measured with a FibroDat 1121/1122 system equipped with a CCD camera. According to the FibroDat software, the measured contact angle (A) was 116° (FIG. 1). Before treatment with 1H, 1H, 2H, 2H-perfluorodecyltriethoxysilane, the contact angle was too low to be measured by the FibroDat system)(<10° and the droplet was quickly disapering into the disc support.

Example 2

A porous α-alumina disc support, as described in Example 1, was calcined in air at 500° C. for 5 hours. After filling the support with filtered distilled water by immersion, the support was immersed in an aqueous solution containing one wt.-% of a cationic polymer (Poly(dimethylamine-coepichlorhydrin-co-ethylenediamine) with an average molecular weight of 75000, from Aldrich). The pH of the aqueous polymer solution had been adjusted to 8 using 25 wt.-% aqueous ammonia solution. After 30 minutes in the aqueous polymer solution, the support was rinsed 4 times with a 0.1 M aqueous ammonia solution and subsequently, after drying in oven for 2 hours at 105° C., the support was immersed into a 2.5 wt.-% ethanol solution of 1H, 1H, 2H, 2H-perfluorodecyltriethoxysilane for 1 hour. Thereafter, the support was dipped into ethanol (99.7%) four times after which the ethanol was replaced by new ethanol. This procedure was repeated six times. After drying in oven for 2 hours at 105° C., the hydrophobic support was immersed in an aqueous dispersion containing 1 wt.-% silicalite-1 crystals with an average diameter of about 50 nm. Deposition of the crystals onto the support surface was allowed to proceed for 10 minutes. After rinsing with 0.1 M aqueous ammonia, the support was calcined in air at 500° C. for 5 hours.

Figure 2A:
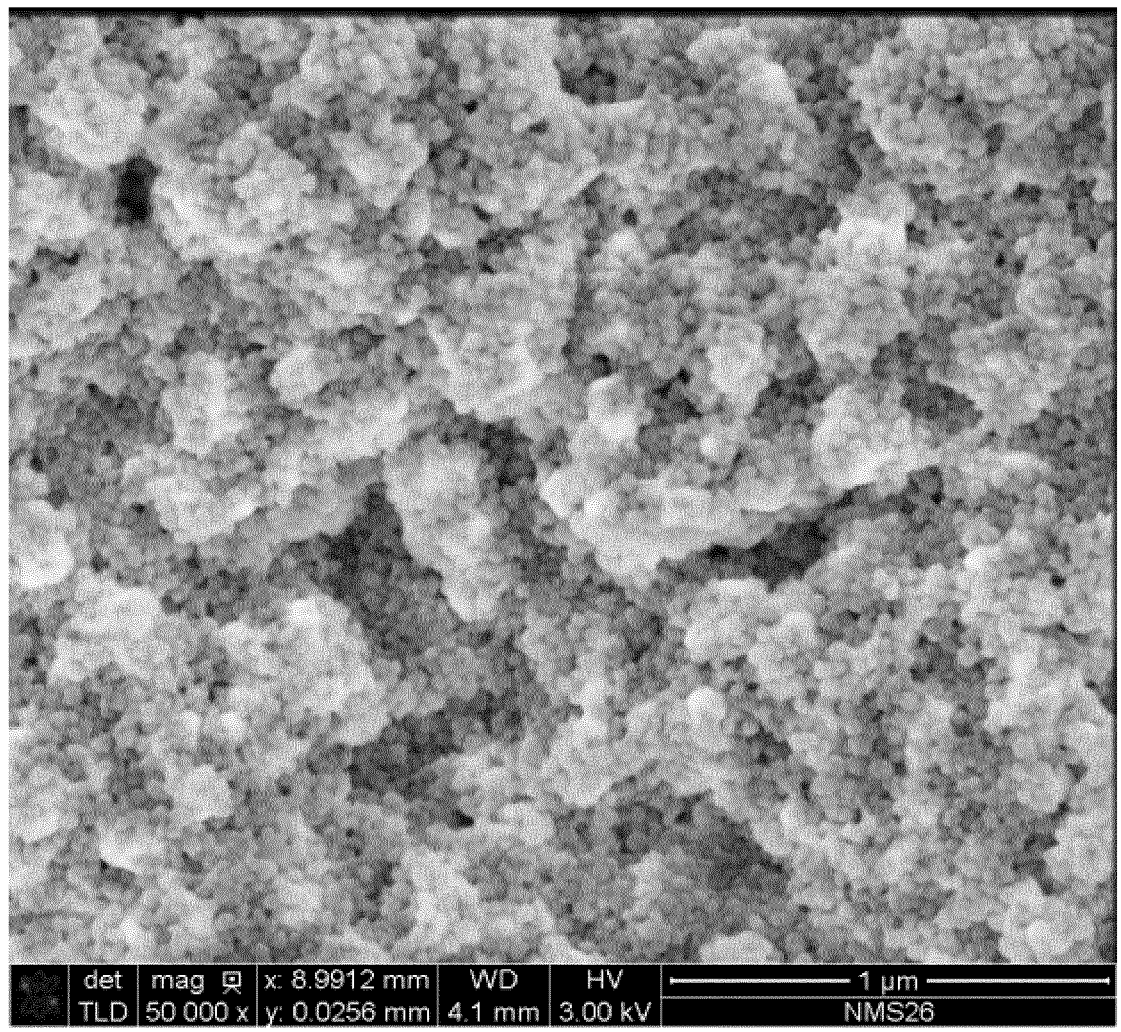
FIG. 2a. Scanning Electron Microscopy image of silicalite-1 crystals in a densely packed monolayer on the top layer of a porous α-alumina support surface modified according to Example 2.
Figure 2B:
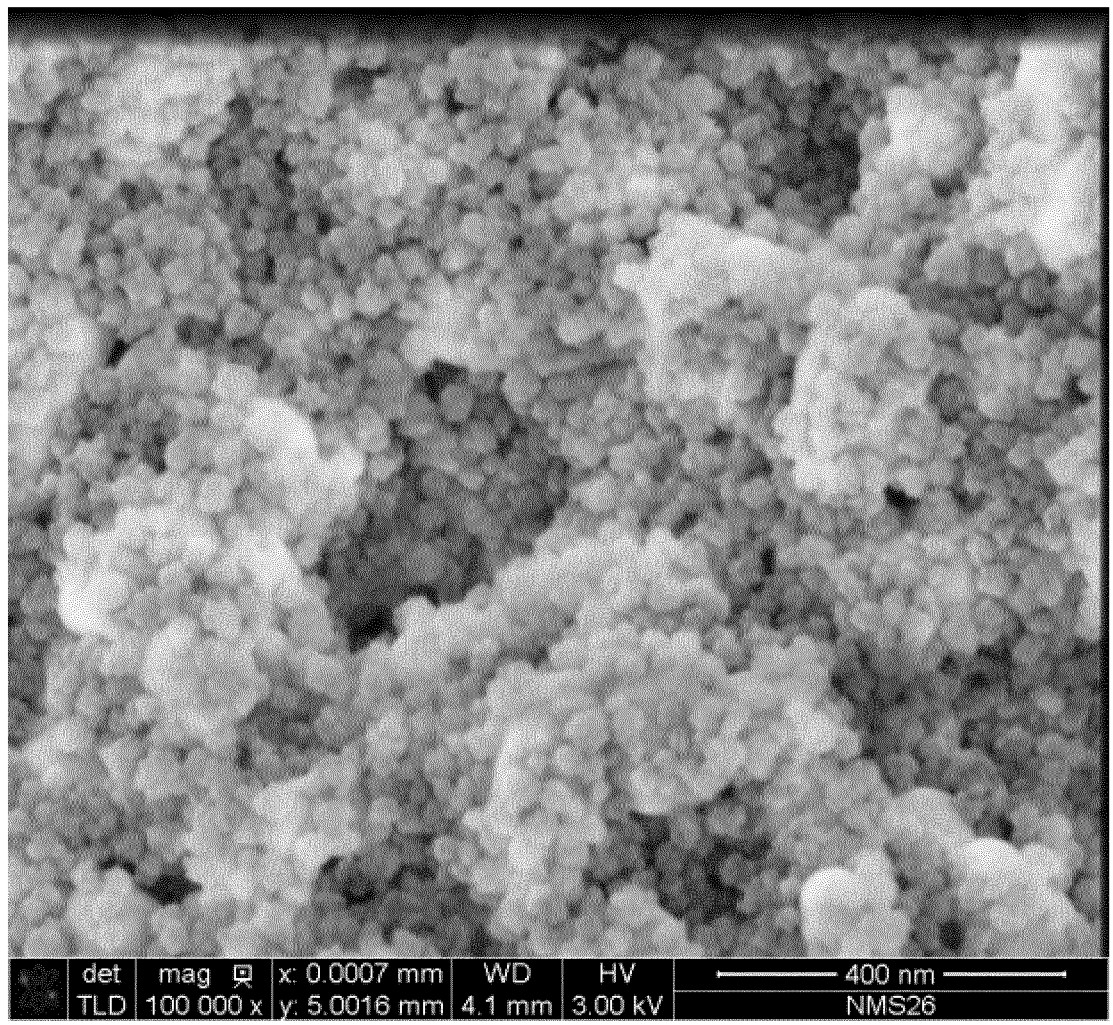
FIG. 2b. Scanning Electron Microscopy image of densely packed silicalite-1 crystals on the top layer of a porous α-alumina support surface modified according to Example 2.

The deposition of the molecular sieve crystals onto the support was examined with Scanning Electron Microscopy (SEM) using a FEI Magellan 400 field emission instrument. The sample was not coated with any coating before the SEM image was recorded. As shown in FIGS. 2a and 2b, the support surface was covered with a densely packed layer of silicalite-1 crystals suitable to grow and intergrow a zeolite film. In FIG. 2a the magnification was 50 000 times and in FIG. 2b the magnification was 100 000 times. All parts of the support were covered with an equally dense layer of silicalite-1 seeds.

Example 3. Prior Art Comparison

A circular disc support of porous α-alumina (25 mm in diameter, 3 mm thick), provided with a 30 μm thick top layer of 100 nm pores and a 3 mm thick base layer with 3 μm pores was calcined in air at 500° C. for 5 hours. The support was then treated by a masking procedure known in the art (WO 00/53298) involving two steps; the first step implies that the top surface of the 100 nm pores was coated with a layer of poly (methyl methacrylate), in the second step the interior of the support was filled with molten hydrocarbon wax at elevated temperature. The hydrocarbon wax solidified after cooling. Subsequently, the poly (methyl methacrylate) was dissolved in acetone and the surface rinsed with 0.1 M aqueous $NH_3$ before the contact angle between a droplet (4 μL) of milliQ water and the dry disc support was measured with a FibroDat 1121/1122 system equipped with a CCD camera. The contact angle was 92°. This value was expected to be influenced by the measured hydrophobicity of the hydrocarbon wax (contact angle θ=107°). It shows that the probed surface consists of hydrophobic parts (wax) and hydrophilic parts (α-alumina), i.e. the surface is heterogenous from a surface energy point of view. Then the support was treated with an aqueous solution adjusted to pH 8 containing 1 wt.-% cationic polymer (Poly(dimethylamine-co-epichlorhydrin-co-ethylenediamine) with an average molecular weight of 75000, from Aldrich) in order to reverse the charge of the support surface. Then the support was rinsed in 4 different 0.1 M aqueous ammonia solutions and dried on a laminar flow bench for 12 hours at ambient temperature.

Figure 3A:
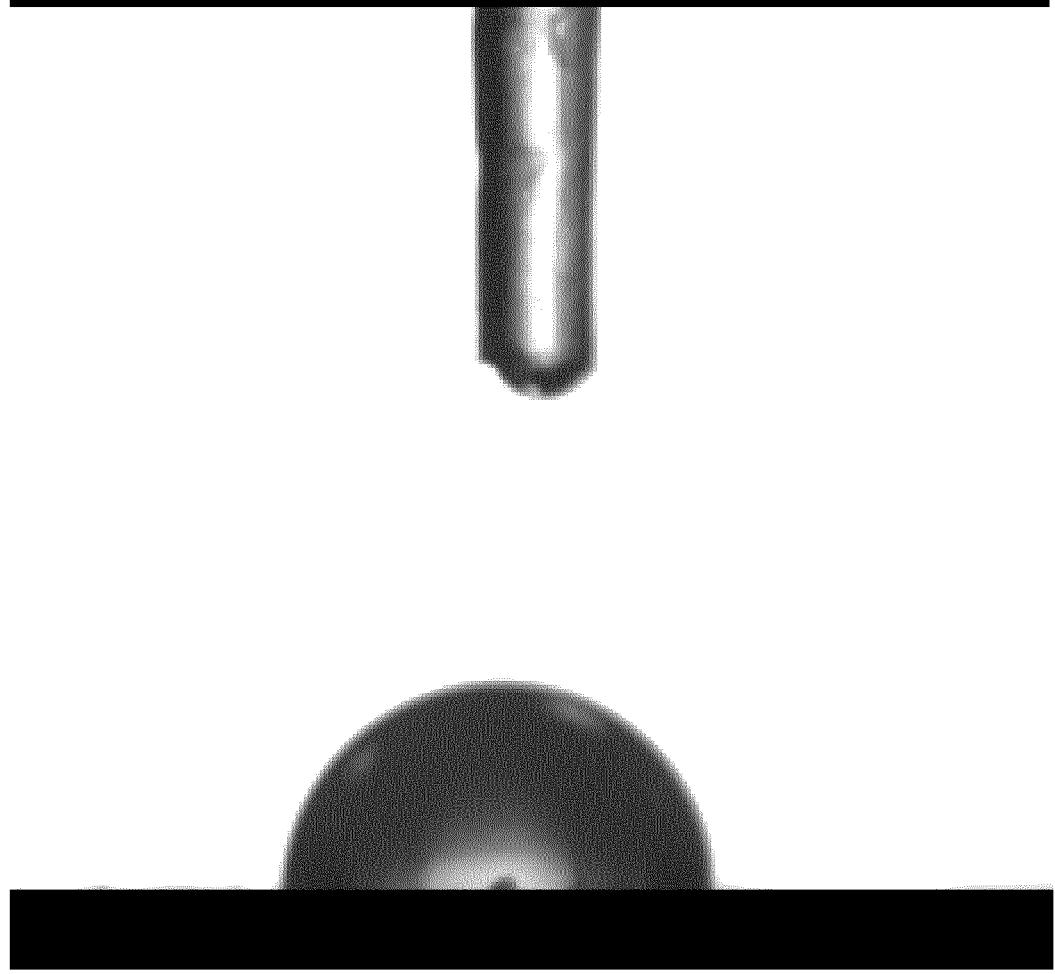
FIG. 3a. CCD camera image of a water droplet on the top-layer of a porous α-alumina support surface modified according to the prior art described in Example 3.
Figure 3B:
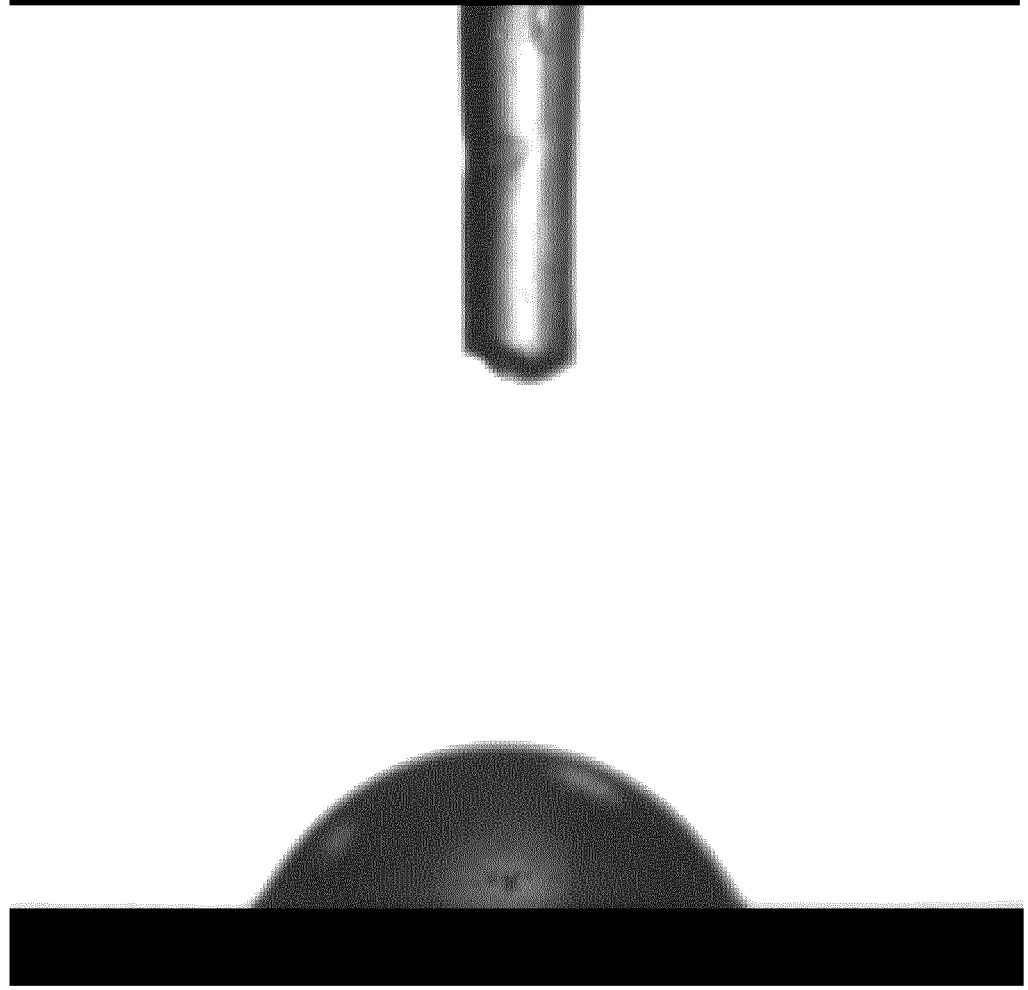
FIG. 3b. CCD camera image of a water droplet on the top layer of a porous α-alumina support surface modified according to the prior art described in Example 3, but rinsed only once after treatment with cationic polymer solution.

The contact angle measured after treatment with cationic polymer was 87° (FIG. 3a). This value shows that the support surface became hydrophilic after treatment with the cationic polymer solution. To further elucidate the effect of the cationic polymer, the treatment of the support with cationic polymer was repeated and excess polymer on the support surface rinsed away by dipping the support once into 0.1 M aqueous $NH_3$ before drying it on a laminar flow bench for 12 hours at ambient temperature. It is evident that less rinsing resulted in a contact angle of 64° and accordingly a more hydrophilic support surface due to higher concentration of cationic polymer on the support surface (FIG. 3b).

Example 4. Prior Art Comparison

Figure 4A:
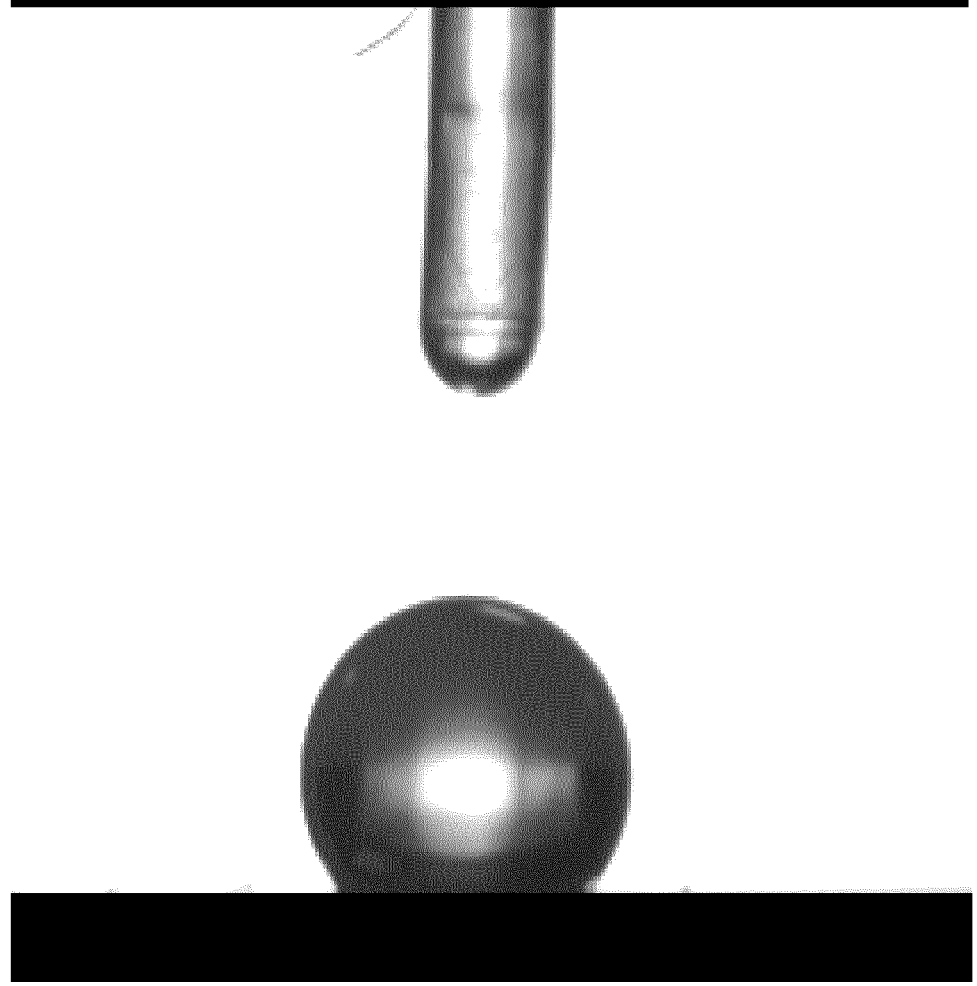
FIG. 4a. CCD camera image of a water droplet on the top layer of a porous α-alumina support surface modified according to the prior art as described in Example 4.

A circular disc support of porous α-alumina (25 mm in diameter, 3 mm thick), provided with a 30 μm thick top layer of 100 nm pores and a 3 mm thick base layer with 3 μm pores was calcined in air at 500° C. for 5 hours. The calcined support was first immersed in 2.5 wt.-% of 1H, 1H, 2H, 2H-perfluoro decyltriethoxysilane in ethanol as solvent (WO 2014140291). The immersion time was 1 hour. After this period of time, the support was rinsed with ethanol according to the procedure described in Example 1 and dried in oven at 105° C. for 2 hours. The hydrophobic support was then immersed for 30 minutes in aqueous ammonia solution (pH=8) containing one wt.-% of the cationic polymer used in Examples 1-3 and rinsed in 4 different 0.1 M aqueous ammonia solutions. After drying in oven for 2 hours at 105° C., the contact angle was measured using the FibroDat 1121/1122 system equipped with a CCD camera. According to the FibroDat software, the measured contact angle was 130° (FIG. 4a). The contact angle of the hydrophobic surface before treatment with cationic polymer was 145°, indicating that the attached cationic polymer made the surface less hydrophobic. Subsequently, the support was immersed in a 1 wt.-% aqueous dispersion containing silicalite-1 crystals with an average diameter of about 50 nm. Deposition of the crystals onto the support surface was allowed to proceed for 10 minutes. After rinsing with 0.1 M aqueous ammonia, the support was calcined in air at 500° C. for 5 hours.

Figure 4B:
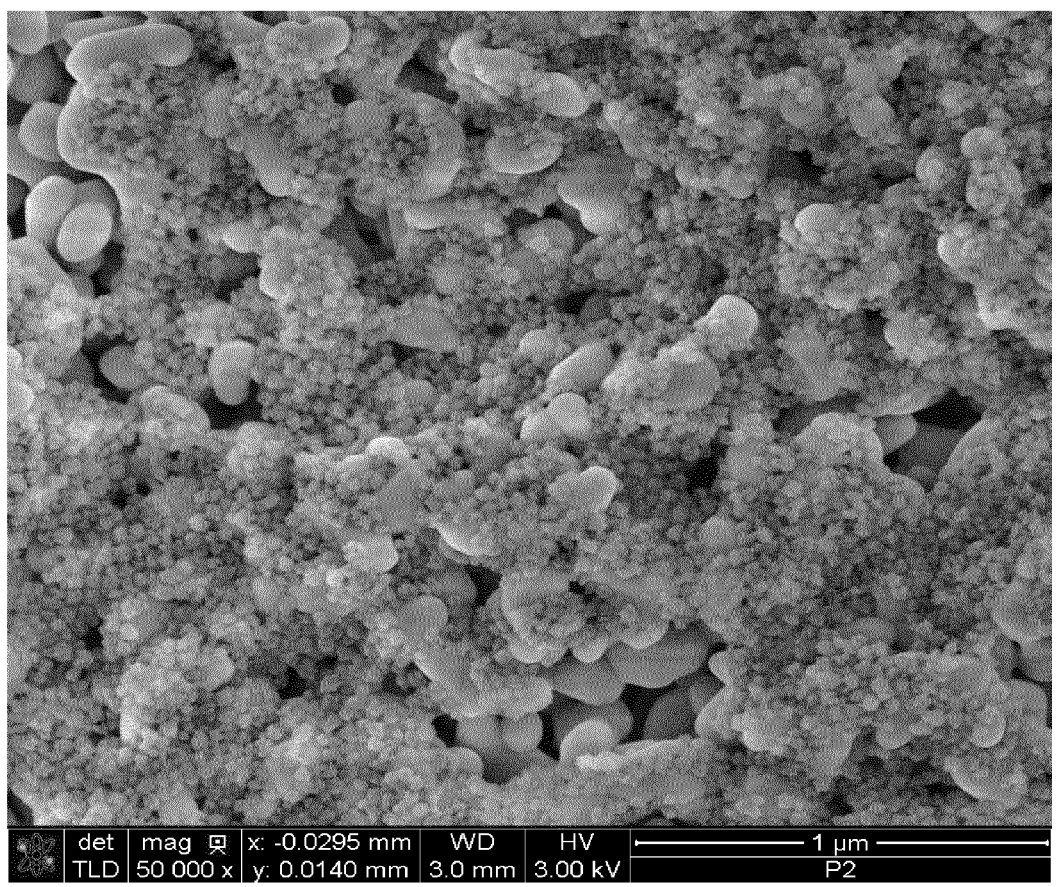
FIG. 4b. Scanning Electron Microscopy image of silicalite-1 crystals on the top layer of a porous α-alumina support surface modified according to the prior art as described in Example 4.

The deposition of the molecular sieve crystals onto the support surface was examined with Scanning Electron Microscopy using a FEI Magellan 400 field emission instrument. The sample was not coated with any coating before the SEM image was recorded. As shown in FIG. 4b, the support surface was covered with a sub-monolayer of silicalite-1 crystals, a coverage not suitable to grow and intergrow a zeolite film. Some spots of the support were not covered with silicalite-1 crystals. These empty spots without seed crystals may result in pinholes in the synthesized membrane and/or prevent intergrowth of the crystals in the film.

Example 5. Prior Art Comparison

Figure 5A:
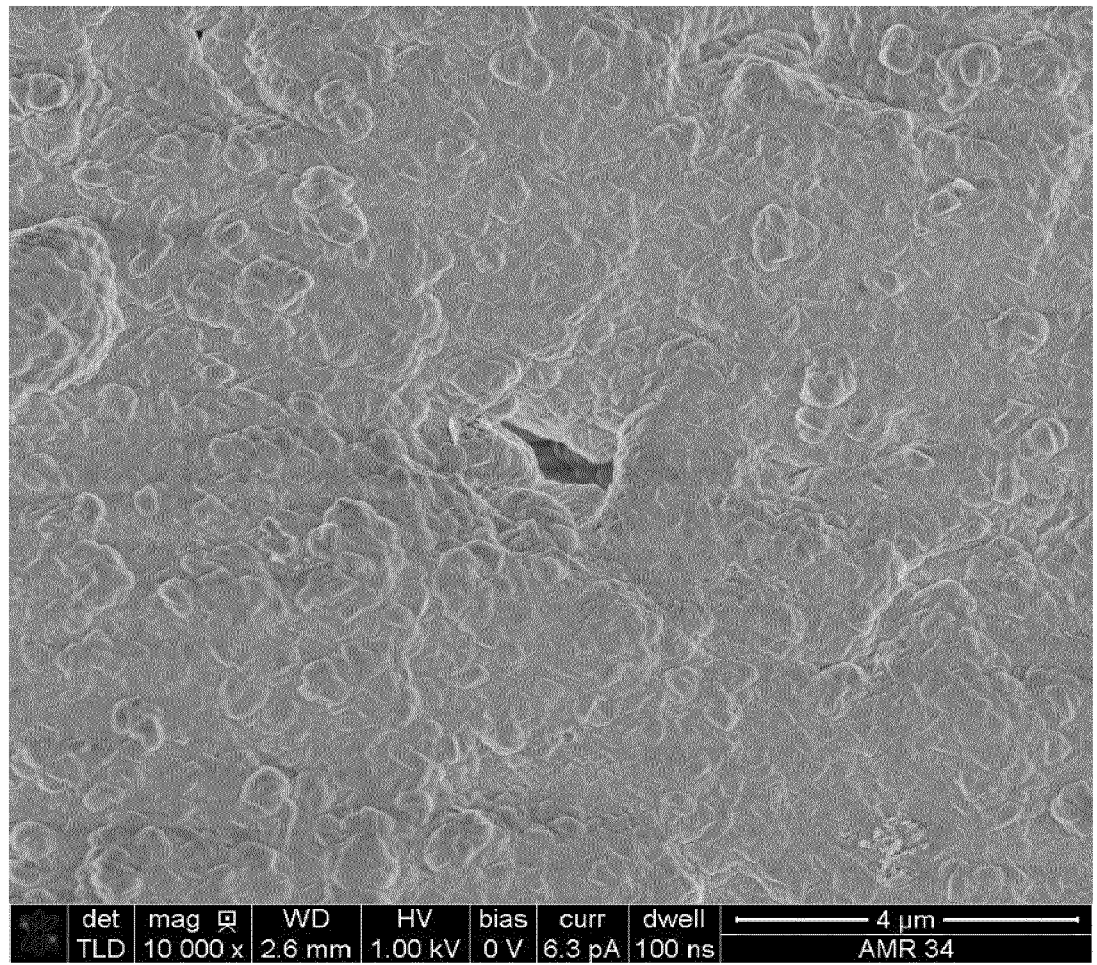
FIG. 5a. Scanning Electron Microscopy image of a surface of a calcined zeolite MFI film synthesized according to the prior art as described in Example 5.
Figure 5B:
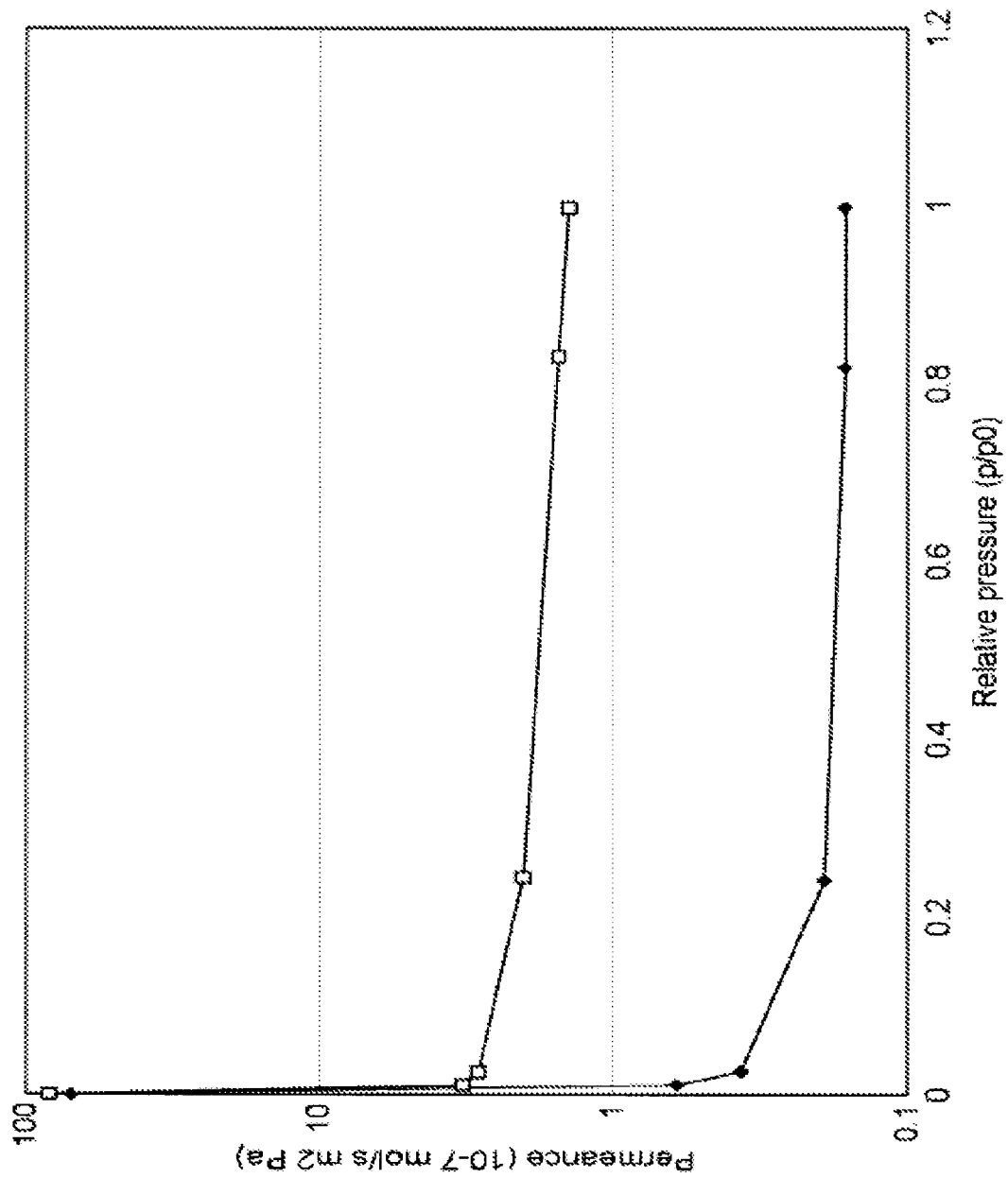
FIG. 5b. A plot of helium permeance vs. relative vapor pressure of n-hexane as measured in permporometry experiments, illustrating the effect of large defects such as pinholes on the permeance of zeolite films (upper trace) and the permeance behavior for a membrane without large defects such as pinholes (lower trace).

A tubular support of porous α-alumina with geometry; L=100 mm, $D_{outer}$=10 mm, and $D_{inner}$=7 mm, was calcined in air at 500° C. The tube was provided with a 30 μm thick inner layer with 100 nm pores and an outer layer with 3 μm pores. The calcined support was first immersed in 2.5 wt.-% of 1H, 1H, 2H, 2H-perfluoro decyltriethoxysilane in ethanol as solvent. The immersion time was 1 hour. After this period of time, the support was dipped into ethanol (99.7%) four times after which the ethanol was replaced by new ethanol. This procedure was repeated six times. Subsequently, the hydrophobic tubular support was allowed to dry in oven at 105° C. for 2 hours and then the support was immersed in an aqueous solution containing one wt.-% of a cationic polymer (Poly(dimethylamine-co-epichlorhydrin-co-ethylenediamine) with an average molecular weight of 75000, from Aldrich). The aqueous polymer solution was adjusted to pH 8 using 25 wt.-% aqueous ammonia solution. After 30 minutes in the aqueous polymer solution, the support was rinsed with 0.1 M aqueous ammonia solution by dipping the support into the ammonia solution four times after which the solution was replaced by a fresh solution. This procedure was repeated four times. Subsequently, the tubular support was treated with wt.-% aqueous dispersion containing silicalite-1 crystals with an average diameter of about 50 nm. Deposition of the crystals onto the support surface was allowed to proceed for 10 minutes. After rinsing with 0.1 M aqueous ammonia, the support was immersed in a synthesis solution with the composition: 25 $SiO_2$: 3 TPAOH: 100 EtOH: 1450$H_2O$ and hydrothermally treated in an oil bath at 88° C. for 71 hours. After cooling, the thin-film composite anisotropic membrane was rinsed with 0.1 M aqueous ammonia to remove loosely bound crystals and oligomers from the surface of the membrane. The single gas helium permeance of the membrane was measured to 0.17 before calcination, which proves the presence of defects such as pinholes in the membrane. A perfect membrane would have zero permeance before calcination since the zeolite pores are blocked with template molecules. The surface of the membrane was investigated carefully by Scanning Electron Microscopy. Most of the surface appeared defect free, but pinholes in the film can be observed at certain locations. A representative image of a pinhole in the membrane is shown in FIG. 5a. The pinholes are a result of the empty spots in the seed layer (Example 4). FIG. 5b shows a plot of helium permeance vs. relative vapor pressure of n-hexane, as measured in a permporometry experiment of the membrane prepared according to example 5 (upper trace) and for a membrane prepared according to Example 8 in the present invention (lower trace). As described in the art [Permporometry analysis of zeolite membranes, Journal of Membrane Science. 345 (2009) 276], the helium permeance measured at a relative vapor pressure of n-hexane of $(p/p_0)=1$ in the permporometry experiment, indicates the amount of defects such as pinholes in the membranes. The membrane prepared according to example 5 has a high helium permeance of 1.4 at this relative vapor pressure (FIG. 5b, upper trace), indicating the existence of defects such as pinholes.

Example 6. Prior Art Comparison

A porous α-alumina disc support, as described in Example 1, was thoroughly rinsed with acetone, ethanol and 0.1 M aqueous ammonia to remove dust and any organic molecules attached to the surface of the substrate. The support was then treated by a masking procedure known in the art (WO 00/53298) involving two steps; the first step implies that the top surface of the 100 nm pores was coated with a thin layer of poly (methyl methacrylate), in the second step the remainder of the support was filled with hydrocarbon wax. Subsequently, the all of the poly(methyl methacrylate) was dissolved in acetone and the surface rinsed with 0.1 M aqueous $NH_3$ before the support was treated with an aqueous solution adjusted to pH 8 (using 25 wt.-% $NH_3(aq)$) containing 1 wt.-% cationic polymer (Poly (dimethylamine-co-epichlorhydrin-co-ethylenediamine) with an average molecular weight of 75000, from Aldrich) in order to reverse the charge of the support surface. After rinsing the support with a 0.1 M aqueous ammonia solution, seeding of the support surface was accomplished by immersion in 1 wt.-% silicalite-1 dispersion for 10 minutes. After seeding, the support was rinsed four times with 0.1 M aqueous solution $NH_3$ to remove excess seed crystals. The seeded support was immersed in a synthesis solution with the composition: 25 $SiO_2$: 3 TPAOH: 100 EtOH: 1500$H_2O$ and hydrothermally treated in an oil bath at 100° C. for 36 hours. After cooling, the sample was rinsed with 0.1 M aqueous $NH_3$ solution to remove loosely bound crystals and oligomers from the surface of the membrane.

Figure 6:
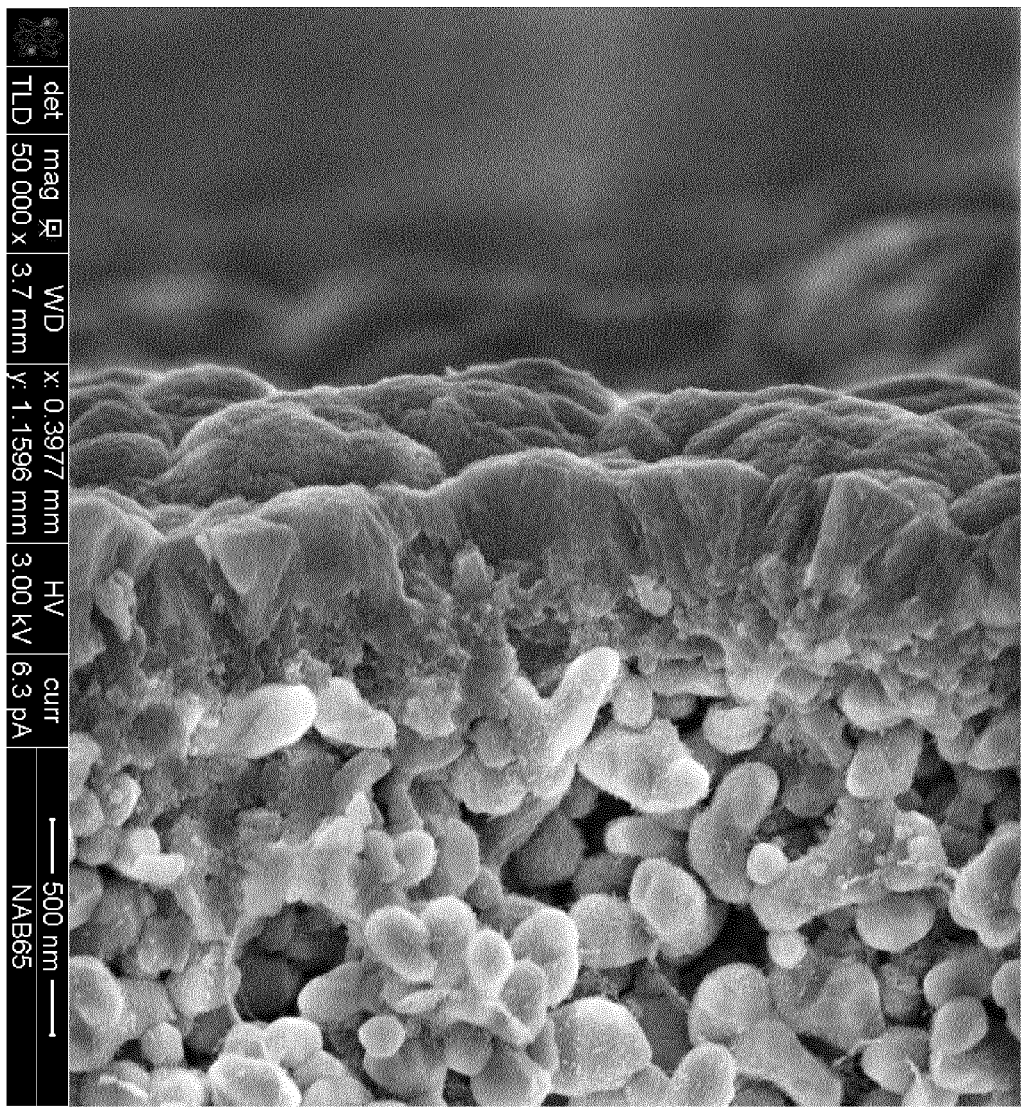
FIG. 6. Scanning Electron Microscopy image of a silicalite-1 membrane synthesized on the top layer of a porous α-alumina support after a masking according to the prior art as described in Example 6.

A representative Scanning Electron Microscopy image of the cross section of the calcined film is shown in FIG. 6. Invasion from the synthesis solution could be detected; the pores between the alumina grains in the support are partially or completely filled with zeolite or silicates from the synthesis solution used for film growth. This is because poly (methyl methacrylate) penetrated into the 100 nm pores or the hydrocarbon wax did not reach completely up to the poly (methyl methacrylate) coating. As the porosity of the alumina support typically is only about 40%, invasion will reduce the permeability of the membrane substantially. Also, invasion makes it difficult to optimize the thickness of the synthesized membrane and may also result in leaching of the support.

The Si/Al ratio of the entire cross section of the film was measured using energy dispersive spectroscopy (EDS) with a method described in the art [J. Membr. Sci. 360 (2010) 265-275]. Depending on the location, the Si/Al ratio varied in the range 45-133. This shows that the masking of the support was uneven. Although the synthesis mixture was free from aluminium, much aluminum was leached from the support and incorporated in the grown film due to the incomplete masking of the alumina support. Consequently, it is not possible to prepare MFI films with high Si/Al ratio on alumina supports by this prior art method.

Example 7

A porous α-alumina disc support, as described in Example 1, was calcined in air at 500° C. for 5 hours. After filling the support with distilled water, the support was immersed in a solution containing one wt.-% of a cationic polymer (Poly(dimethylamine-co-epichlorhydrin-co-ethylenediamine) with an average molecular weight of 75000, from Aldrich) dissolved in an aqueous ammonia (pH=8.5) solution. After 10 minutes in the aqueous polymer solution, the support was rinsed in 0.1 M aqueous ammonia solution and subsequently, after drying for 2 hours on a hot plate (110° C.) placed in a laminar flow bench, the support was immersed completely in a 2.5 wt.-% ethanol solution of 1H, 1H, 2H, 2H-perfluorodecyltriethoxysilane for 1 hour. Thereafter, the support was dipped into ethanol (99.7%) four times after which the ethanol was replaced by new ethanol. This procedure was repeated six times. After drying again for 2 hours on a hot plate (110° C.) placed in a laminar flow bench, the support was immersed completely in aqueous dispersion (pH 10) containing 1 wt.-% silicalite-1 crystals with an average diameter of about 50 nm. Deposition of the crystals onto the support surface was allowed to proceed for 10 minutes. After rinsing with a 0.1 M aqueous ammonia solution, the support was immersed completely in a synthesis solution with the molar composition: 25 $SiO_2$: 3 TPAOH: 100 EtOH: 1500$H_2O$ and hydrothermally treated in an oil bath at 100° C. for 36 hours. After cooling, the sample was rinsed with 0.1 M aqueous $NH_3$ solution to remove loosely bound crystals and oligomers from the surface of the membrane.

The Si/Al ratio of the entire cross section of the film was measured at various locations of the support using (EDS), a method described in the art [J. Membr. Sci. 360 (2010) 265-275]. Depending on the location, the Si/Al ratio varied between 97 and 152. The Si/Al ratios measured with EDS in Example 6 (prior art) are smaller than the Si/Al ratios measured with EDS in Example 7 and illustrates the possibility to prepare MFI films with higher Si/Al ratio (less hydrophilic characteristic) with the method disclosed herein as compared to prior art (Example 6).

Example 8

A porous α-alumina tubular support with geometry; L=100 mm, $D_{outer}$=10 mm, and $D_{inner}$=7 mm, was calcined in air at 500° C. The support was provided with a 30 μm thick top-layer with 100 nm pores and an 1.5 mm thick base layer with 3 μm pores. In-between these layers, there is also a 30-40 μm thick layer of intermediate pore size. The porous support was filled with filtered distilled water and then immersed in an aqueous solution containing one wt.-% of cationic polymer (Poly(dimethylamine-co-epichlorhydrin-co-ethylenediamine) with an average molecular weight of 75000, from Aldrich) for 30 minutes. The aqueous polymer solution was adjusted to pH 8 using 25 wt.-% aqueous ammonia solution. Subsequently, the tubular support was rinsed with filtered 0.1 M $NH_3$ solution, by dipping the ceramic tube 10 times in each of 6 Teflon tubes filled with filtered 0.1 M $NH_3$ solution, and then dried on a laminar flow bench for 12 hours. Thereafter the whole support was treated with filtered 2.5 wt.-% 1H, 1H, 2H, 2H-perfluoro decyltriethoxysilane in ethanol as solvent for 1 hour. After this treatment, the whole support was rinsed with filtered ethanol (99.7%) for 1 hour (6 Teflon tubes with filtered ethanol×10 min. in each tube) and dried on a laminar flow bench for 12 hours. Subsequently, the tubular support was treated with filtered one wt.-% aqueous dispersion containing silicalite-1 crystals (pH 10) with an average diameter of about 50 nm. Deposition of the crystals onto the substrate surface was allowed to proceed for 15 minutes. After rinsing with 0.1 M aqueous ammonia solution, the support was immersed in synthesis solution with the molar composition: 25 $SiO_2$: 3 TPAOH: 100 EtOH: 1450$H_2O$ and hydrothermally treated in an oil bath at 88° C. for 71 hours. After cooling, the sample was rinsed with filtered 0.1 M aqueous $NH_3$ to remove loosely bound crystals and oligomers from the surface of the membrane. The single gas helium permeance of the membrane before calcination was lower than 0.02 verifying that the membrane was essentially free from cracks and pinholes.

Figure 7:
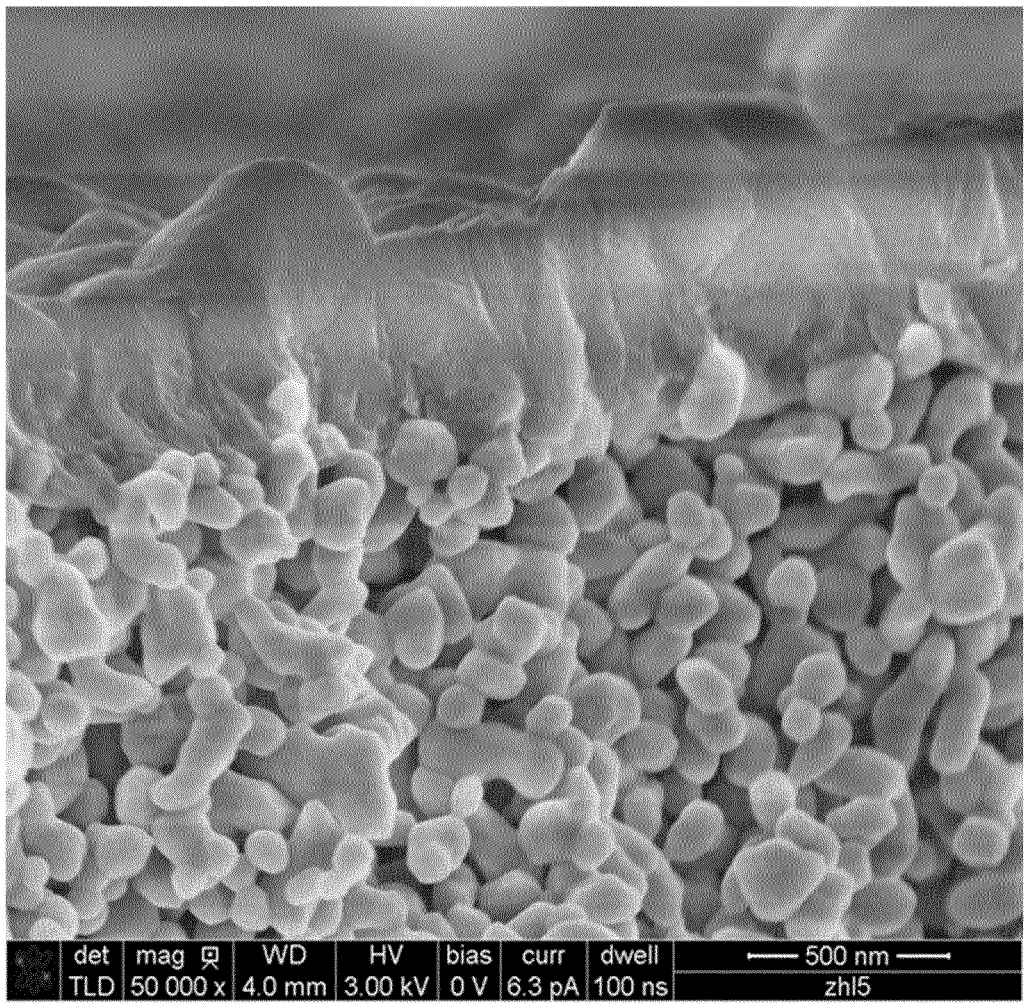
FIG. 7. Scanning Electron Microscopy image of a silicalite-1 membrane synthesized on the top layer of a porous 10 cm α-alumina tubular support prepared according to the present invention as described in Example 8.

A representative Scanning Electron Microscopy image of the cross section of the calcined membrane is shown in FIG. 7. As illustrated in FIG. 7, the pores of the support are fully open. No zeolite invasion of the support could be detected by recording numerous SEM images at various locations of the cross section, implying that synthesis solution could not penetrate through the hydrophobic barrier of the support.

FIG. 5b shows a plot of helium permeance vs. relative vapor pressure of n-hexane, as measured in a permporometry experiment, of the membrane prepared according to Example 8 in the present invention (lower trace). The membrane prepared according to Example 8 in the present invention has a much lower helium permeance of only 0.17 at a relative pressure $p/p_0$=1, which confirms a much smaller number of defects such as pinholes in comparison to the membrane prepared according to prior art in example 5.

Example 9

A porous α-alumina tube with geometry; L=500 mm, $D_{outer}$=10 mm, and $D_{inner}$=7 mm, was calcined in air at 500° C. The tube was provided with a 30 μm thick inner layer with 100 nm pores and an 1.5 mm thick outer layer with 3 μm pores. In between these layers there is a 30-40 μm thick layer of intermediate pore size. The porous support was filled with filtered distilled water and then immersed in an aqueous solution containing one wt.-% of cationic polymer (Poly(dimethylamine-co-epichlorhydrin-co-ethylenediamine) with an average molecular weight of 75000, from Aldrich) for 30 minutes. The aqueous polymer solution was adjusted to pH 8 using 25 wt.-% aqueous ammonia solution. Subsequently, the tubular support was rinsed with filtered 0.1 M $NH_3$ solution, by dipping the ceramic tube 10 times in each of 6 Teflon tubes filled with filtered 0.1 M $NH_3$ solution, and then dried on a laminar flow bench for 12 hours. Thereafter, the whole tube was treated with filtered 2.5 wt.-% 1H, 1H, 2H, 2H-perfluoro decyltriethoxysilane in ethanol as solvent for 1 hour. After this treatment, the whole support was rinsed with filtered ethanol (99.7%) for 1 hour (6 Teflon tubes with filtered ethanol×10 minutes in each tube) and dried on a laminar flow bench for 12 hours. Subsequently, the tubular support was treated with filtered one wt.-% aqueous dispersion containing silicalite-1 crystals (pH 10) with an average diameter of about 50 nm. Deposition of the crystals onto the substrate surface was allowed to proceed for 15 minutes. After rinsing with 0.1 M aqueous ammonia solution, the support was immersed completely in synthesis solution with the molar composition: 25 $SiO_2$: 3 TPAOH: 100 EtOH: 1450$H_2O$ and hydrothermally treated in an autoclave at 88° C. for 56 hours. After cooling, the sample was rinsed with filtered 0.1 M aqueous $NH_3$ to remove loosely bound crystals and oligomers from the surface of the membrane. The single gas helium permeance of the membrane before calcination was lower than 0.02, verifying that the membrane was free from large defects such as pinholes.

Figure 8:
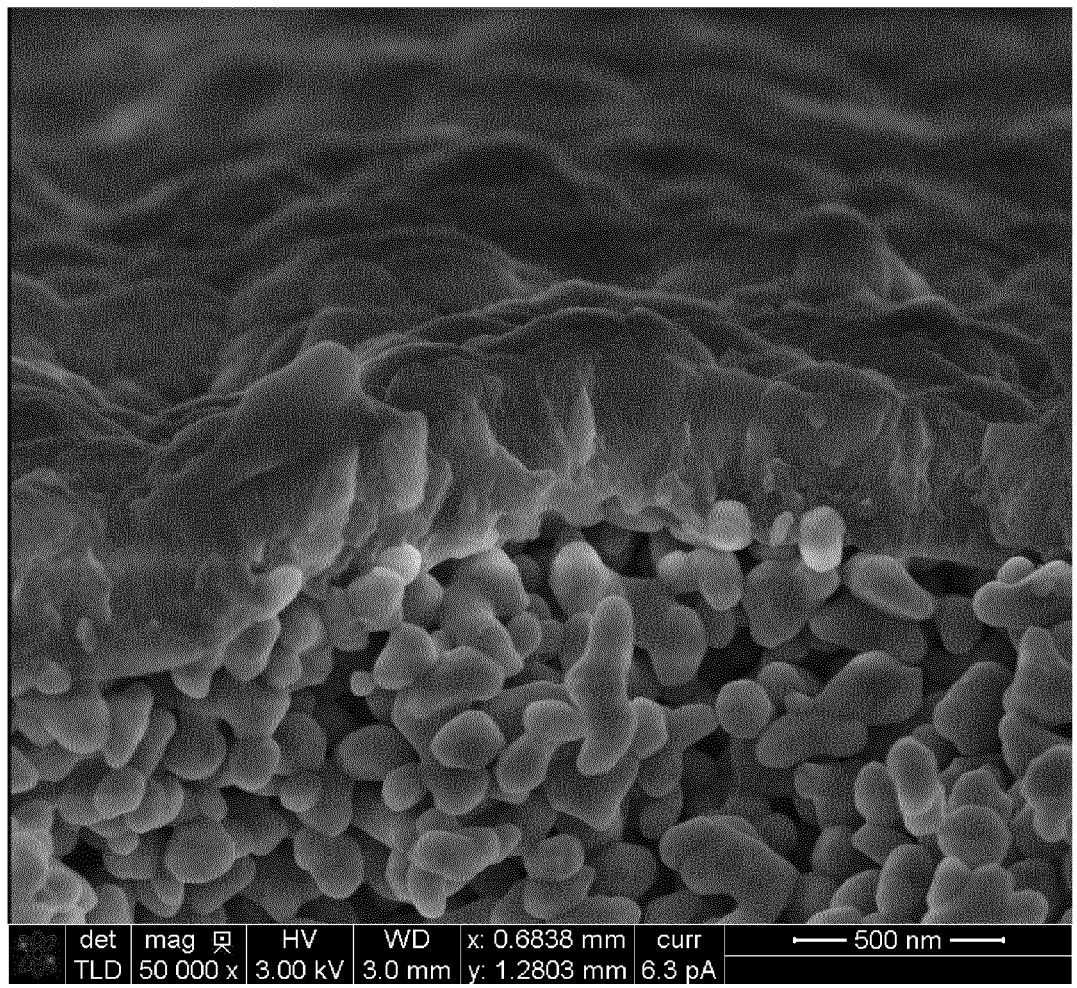
FIG. 8. Scanning Electron Microscopy image of a silicalite-1 membrane synthesized on the top layer of a porous 50 cm α-alumina tubular support, prepared according to the present invention as described in Example 9.

A representative Scanning Electron Microscopy image of the cross section of the calcined membrane is shown in FIG. 8. As illustrated in FIG. 8, the pores of the support are fully open. No zeolite invasion of the support could be detected by recording numerous SEM images at various locations of the cross section, implying that synthesis solution could not penetrate through the hydrophobic barrier of the support. This illustrates that the method disclosed herein is suitable also for the preparation of large single channel membranes.

Example 10

A porous α-alumina tubular support with 19 channels and the geometry; L=500 mm, $D_{outer}$=25 mm, and a channel diameter of 3.5 mm was calcined in air at 500° C. Each channel was provided with a 30 μm thick inner/top layer with 100 nm pores and an outer/base layer with 3 μm pores. The porous support was filled with filtered distilled water and then immersed in an aqueous solution containing one wt.-% of cationic polymer (Poly(dimethylamine-co-epichlorhydrin-co-ethylenediamine) with an average molecular weight of 75000, from Aldrich) for 30 minutes. The aqueous polymer solution was adjusted to pH 8 using 25 wt.-% aqueous ammonia solution. Subsequently, the tubular support was rinsed with a filtered 0.1 M $NH_3$ solution, by dipping the ceramic tube 10 times in each of 6 Teflon tubes filled with filtered 0.1 M $NH_3$ solution, and then dried on a laminar flow bench for 12 hours. Thereafter, the support was immersed completely in filtered 2.5 wt.-% 1H, 1H, 2H, 2H-perfluoro decyltriethoxysilane in ethanol as solvent for 1 hour. After this treatment, the whole support was rinsed with filtered ethanol (99.7%) for 1 hour (6 Teflon tubes with filtered ethanol×10 minutes in each tube) and dried on a laminar flow bench for 12 hours. Subsequently, the tubular support was treated with filtered one wt.-% aqueous dispersion (pH 10) containing silicalite-1 crystals with an average diameter of about 50 nm. Deposition of the crystals onto the substrate surface was allowed to proceed for 15 minutes. After rinsing with 0.1 M aqueous ammonia solution, the support was immersed completely in a synthesis solution with the molar composition: 25 $SiO_2$: 3 TPAOH: 100 EtOH: 1450$H_2O$ and hydrothermally treated in an autoclave at 88° C. for 56 hours. After cooling, the sample was rinsed with filtered 0.1 M aqueous $NH_3$ solution to remove loosely bound crystals and oligomers from the surface of the membrane and calcined in air at 500° C.

Figure 9:
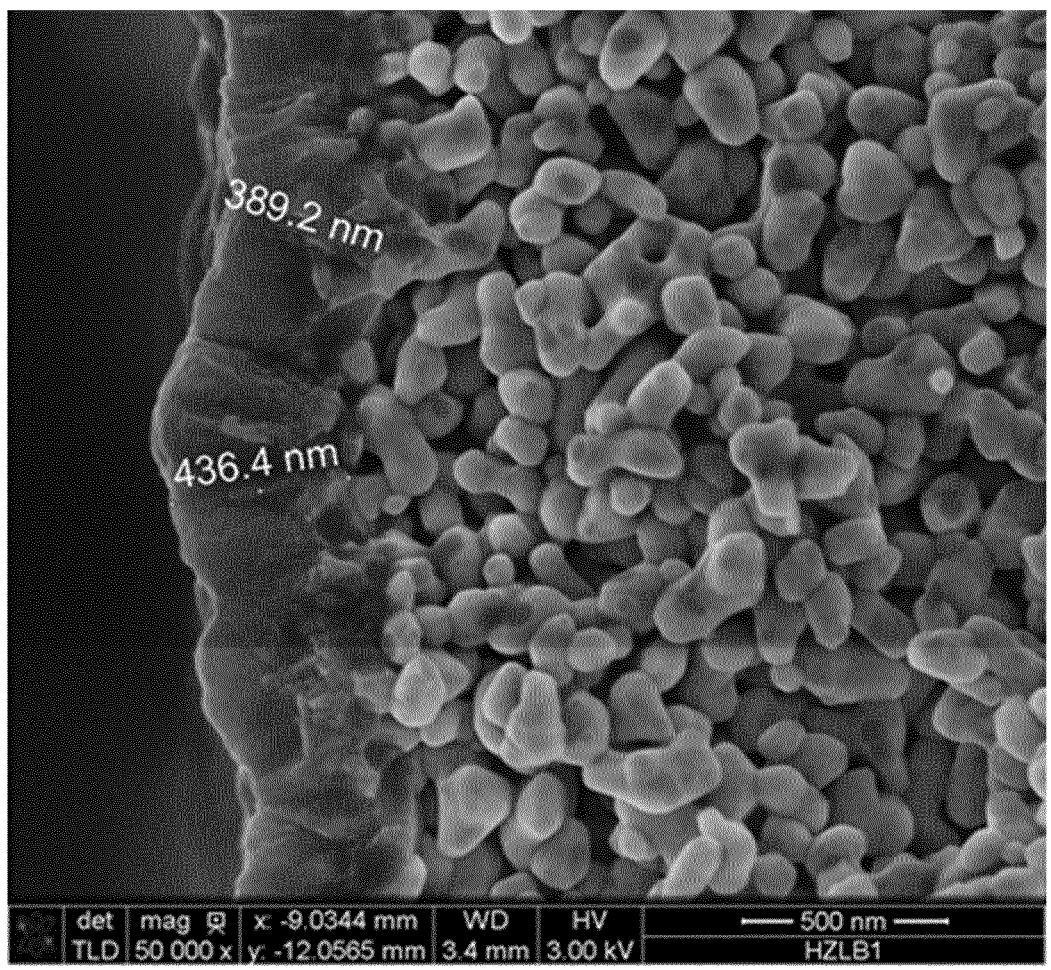
FIG. 9. Scanning Electron Microscopy image of a silicalite-1 membrane synthesized on the top layers of a porous α-alumina support with 19 channels, prepared according to the present invention as described in Example 10.

A representative Scanning Electron Microscopy image of the cross section of the calcined membrane is shown in FIG. 9. As illustrated in FIG. 9, the pores of the support are fully open. No zeolite invasion of the support could be detected by recording numerous SEM images at various locations of the cross section, implying that synthesis solution could not penetrate through the hydrophobic barrier of the support. This illustrates that the method disclosed herein is suitable also for the preparation of large multi-channel membranes.

Example 11

A porous α-alumina disc support, as described in Example 1, was calcined in air at 500° C. for 5 hours. After filling the support with distilled water, the support was immersed in a solution containing one wt.-% of a cationic polymer (Poly(dimethylamine-co-epichlorhydrin-co-ethyl-enediamine) with an average molecular weight of 75000, from Aldrich) dissolved in an aqueous ammonia (pH=8.5) solution. After 10 minutes in the aqueous polymer solution, the support was rinsed in 0.1 M aqueous ammonia solution and subsequently, after drying for 2 hours on a hot plate (110° C.) placed in a laminar flow bench, the support was immersed completely in a 2.5 wt.-% ethanol solution of 1H, 1H, 2H, 2H-perfluorodecyltriethoxysilane for 1 hour. Thereafter, the support was dipped into ethanol (99.7%) four times after which the ethanol was replaced by new ethanol. This procedure was repeated six times. After drying again for 2 hours on a hot plate (110° C.) placed in a laminar flow bench, the support was immersed completely in aqueous dispersion (pH 10) containing 1 wt.-% silicalite-1 crystals with an average diameter of about 50 nm. Deposition of the crystals onto the support surface was allowed to proceed for 10 minutes. After rinsing with 0.1 M aqueous ammonia, the support was immersed completely in a synthesis solution with the molar composition 25 $SiO_2$: 0.25 $Al_2O_3$: 3 TPAOH: 1 $Na_2O$: 100 EtOH: 1600$H_2O$: and hydrothermally treated in an oil bath at 100° C. for 22 hours. Aluminum isopropoxide (98.0%, Aldrich) was used as aluminum source to obtain a Si/Al ratio of 50 in the synthesis mixture and sodium hydroxide (NaOH, 99.0, Merck) was used to increase the basicity of the solution. After cooling, the membrane was rinsed with filtered 0.1 M aqueous $NH_3$ to remove loosely bound crystals and oligomers from the surface of the membrane and calcined in air at 500° C.

Figure 10A:
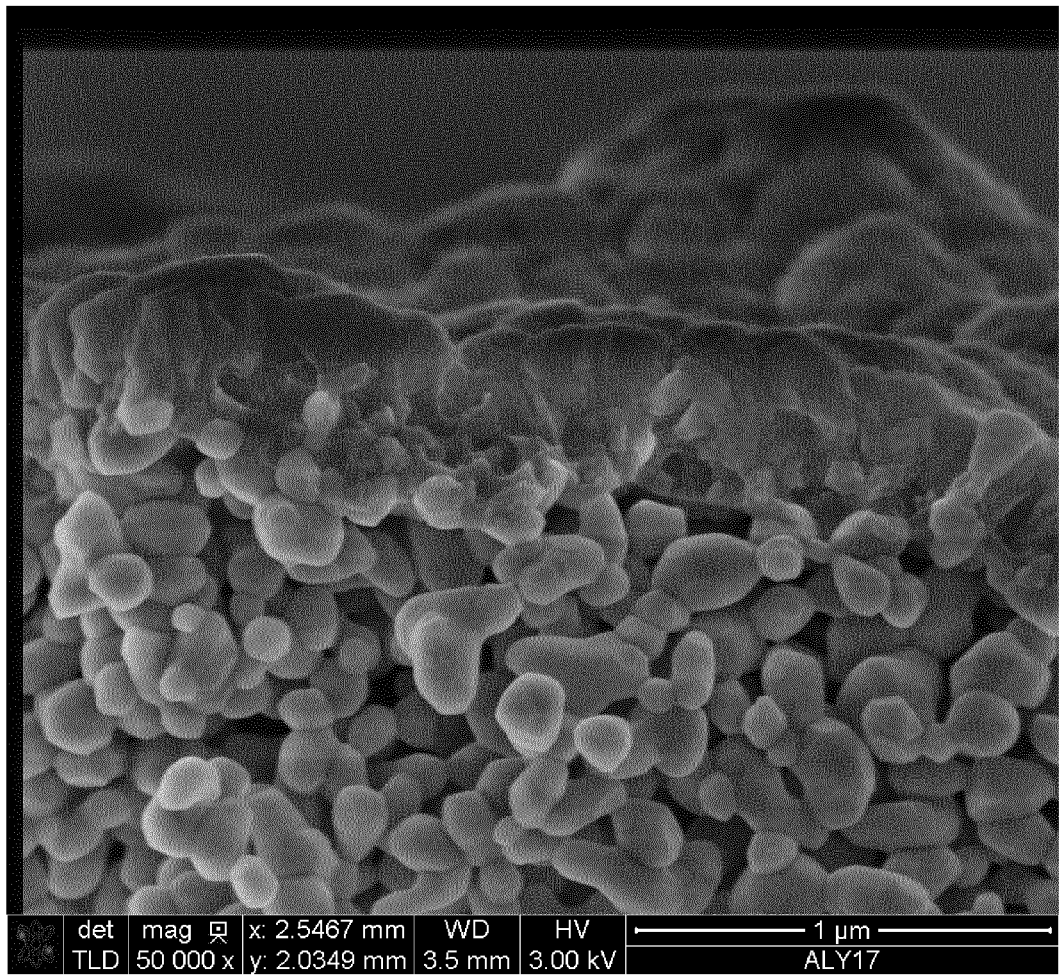
FIG. 10a. Scanning Electron Microscopy image of a ZSM-5 membrane synthesized on the top layer of a porous α-alumina disc support, prepared according to the present invention as described in Example 11.

A representative Scanning Electron Microscopy image of the cross section of the resulting ZSM-5 membrane with an Si/Al ratio of 50 is shown in FIG. 10a. As illustrated in FIG. 10a, the pores of the support are fully open, and no invasion of the support could be detected by recording numerous SEM images at various locations of the cross section, implying that synthesis solution could not penetrate through the hydrophobic barrier of the support. This illustrates that it is possible to prepare MFI zeolite membranes with a higher aluminum content, i.e. ZSM-5 membranes, with the method of the present invasion.

Figure 10B:
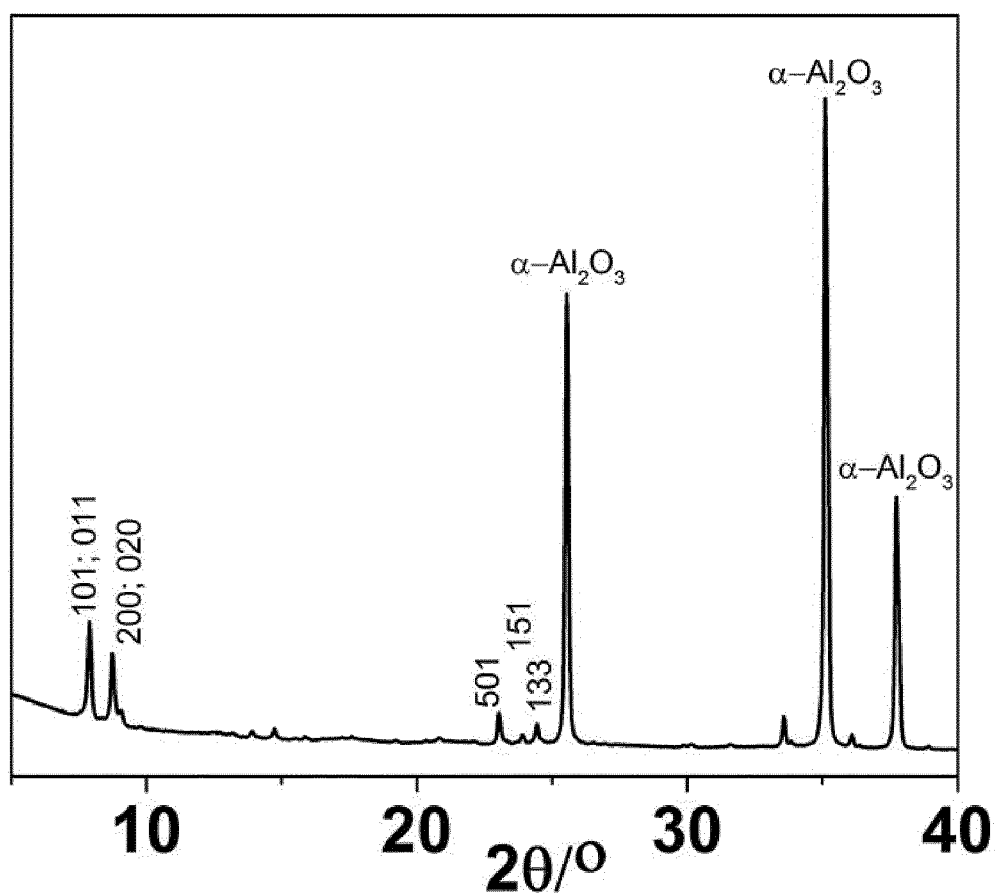
FIG. 10b. XRD pattern of the ZSM-5 membrane prepared according to the present invention as described in Example 11.

FIG. 10 b shows the XRD pattern of the ZSM-5 membrane, measured with a PANalytical Empyrean X-ray Diffractometer. The membrane was prepared according to the present invention as described in Example 11. The diffraction pattern verifies the MFI structure and reflections from the MFI structure are labeled with the appropriate Miller indices, while reflections from the support are labelled with "α-$Al_2O_3$".

Example 12

A porous α-alumina disc support, as described in Example 1, was calcined in air at 500° C. for 5 hours. After filling the support with distilled water, the support was immersed in a solution containing one wt.-% of a cationic polymer (Poly(dimethylamine-co-epichlorhydrin-co-ethyl-enediamine) with an average molecular weight of 75000, from Aldrich) dissolved in aqueous ammonia (pH=8.5). After 10 minutes in the aqueous polymer solution, the support was rinsed in 0.1 M aqueous ammonia solution and subsequently, after drying for 2 hours on a hot plate (110° C.) placed in a laminar flow bench, the support was immersed completely in a 2.5 wt.-% ethanol solution of 1H, 1H, 2H, 2H-perfluorodecyltriethoxysilane for 1 hour. Thereafter, the support was dipped into ethanol (99.7%) four times after which the ethanol was replaced by new ethanol. This procedure was repeated six times. After drying again for 2 hours on a hot plate (110° C.) placed in a laminar flow bench, the support was immersed completely in aqueous dispersion (pH 10) containing 1 wt.-% silicalite-1 crystals with an average diameter of about 50 nm. Deposition of the crystals onto the support surface was allowed to proceed for 10 minutes. After rinsing with 0.1 M aqueous ammonia, the support was immersed completely in a synthesis solution with the molar composition 25 $SiO_2$: 0.50 $Al_2O_3$: 3 TPAOH: 1 $Na_2O$: 100 EtOH: 1600$H_2O$: and hydrothermally treated in an oil bath at 150° C. for 14 hours. Aluminum isopropoxide (98.0%, Aldrich) was used as aluminum source to obtain a Si/Al ratio of 25 and sodium hydroxide (NaOH, 99.0, Merck) was used to increase the basicity of the solution. After cooling, the membrane was rinsed with filtered 0.1 M aqueous $NH_3$ to remove loosely bound crystals and oligomers from the surface of the membrane and calcined in air at 500° C.

Figure 11:
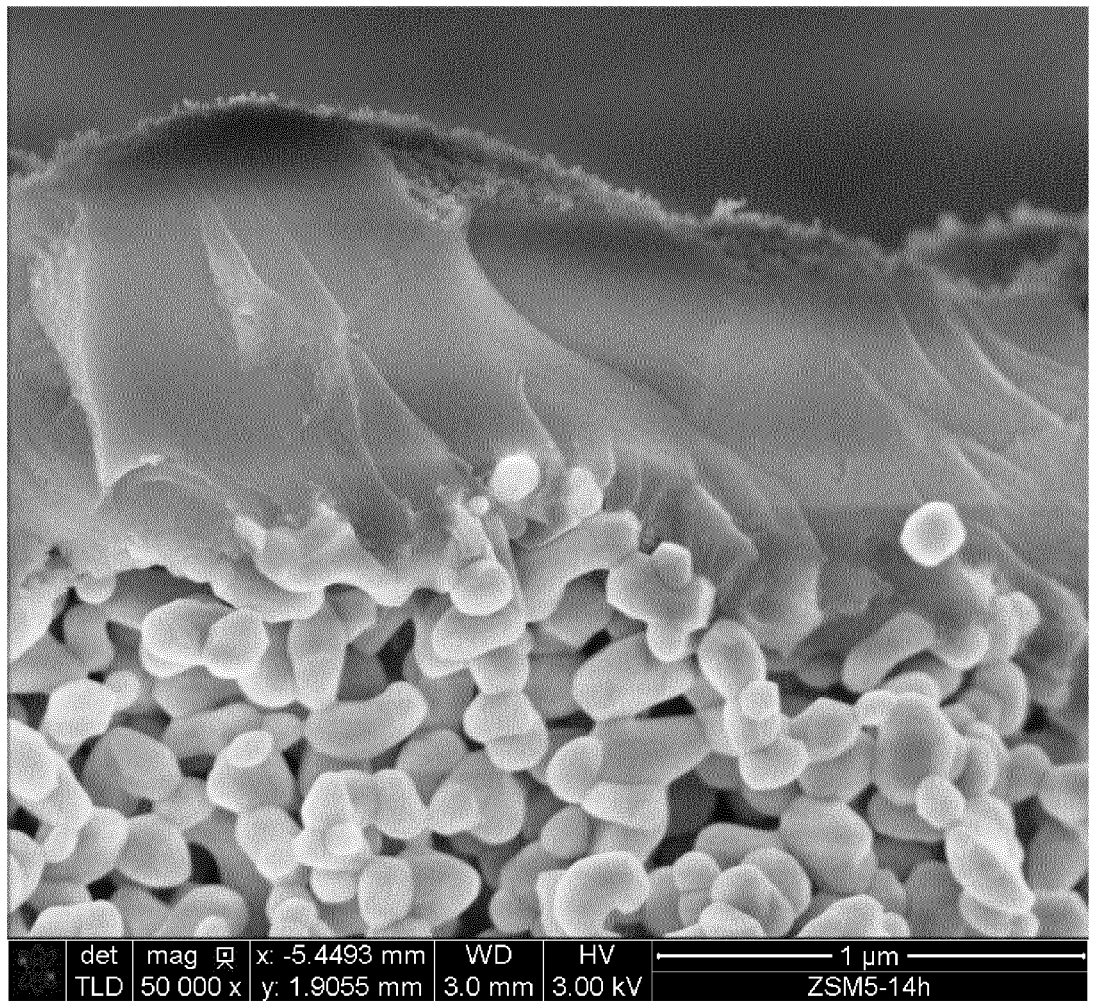
FIG. 11. Scanning Electron Microscopy image of a ZSM-5 membrane synthesized on the top layer of a porous α-alumina disc support, prepared according to the present invention as described in Example 12.

A representative Scanning Electron Microscopy image of the cross section of the ZSM-5 membrane with an Si/Al ratio of 25 is shown in FIG. 11. As illustrated in FIG. 11, the pores of the support are fully open, and no invasion of the support could be detected by recording numerous SEM images at various locations of the cross section, implying that synthesis solution could not penetrate through the hydrophobic barrier of the support. This illustrates that it is possible to prepare MFI zeolite membranes with a higher aluminum content, i.e. ZSM-5 membranes, with the method of the present invasion.

Example 13

A porous α-alumina disc support, as described in Example 1, was calcined in air at 500° C. for 5 hours. After filling the support with distilled water, the support was immersed in a solution containing one wt.-% of a cationic polymer (Poly(dimethylamine-co-epichlorhydrin-co-ethyl-enediamine) with an average molecular weight of 75000, from Aldrich) dissolved in aqueous ammonia (pH=10). After 10 minutes in the aqueous polymer solution, the support was rinsed in 0.1 M aqueous ammonia solution and subsequently, after drying in oven for 2 hours at 105° C., the support was immersed into a 2.5 wt.-% ethanol solution of 1H, 1H, 2H, 2H-perfluoro decyltriethoxysilane for 1 hour. Thereafter, the support was dipped into ethanol (99.7%) four times after which the ethanol was replaced by new ethanol. This procedure was repeated six times. After drying in oven for 2 hours at 105° C., the support was immersed in an aqueous dispersion containing 1 wt.-% chabazite crystals with an average diameter of about 178 nm according to dynamic light scattering. The chabazite crystals had been prepared from larger crystals by milling. Deposition of the crystals onto the support surface was allowed to proceed for 10 minutes. After rinsing with a 0.1 M aqueous ammonia solution, the support was immersed in a synthesis solution with the molar composition of 1 $SiO_2$: 1,4 N, N, N-trimethyl-1-adamantyl ammonium fluoride: $8H_2O$ and hydrothermally treated in an oil bath at 160° C. for 12 hours. After cooling, the sample was rinsed with a filtered 0.1 M aqueous $NH_3$ solution to remove loosely bound crystals and oligomers from the surface of the membrane.

Figure 12A:
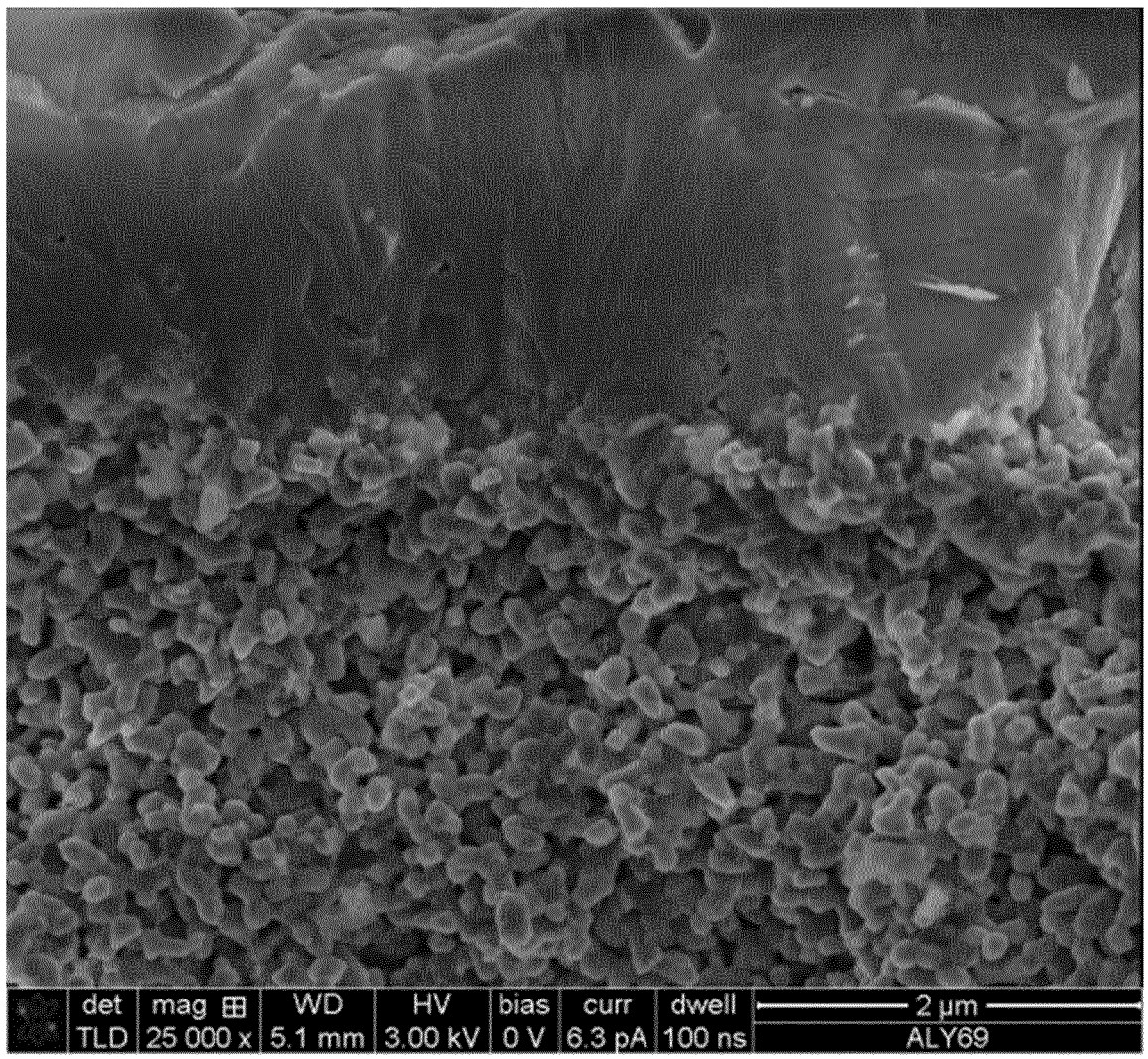
FIG. 12a. Scanning Electron Microscopy image of a cross section of a CHA membrane synthesized on the top layer of a porous α-alumina disc support, prepared according to the present invention as described in Example 13.

A representative Scanning Electron Microscopy image of the cross section of the calcined CHA membrane is shown in FIG. 12a. As illustrated by the representative SEM-image in FIG. 12a, the pores of the support are fully open, and no invasion of the support could be detected. Numerous SEM images were recorded at various locations of the cross section, with similar results. This shows that the synthesis solution could not penetrate through the hydrophobic barrier of the support, even though the synthesis of the CHA zeolite membrane was carried out at high temperature and pressure in an autoclave.

Figure 12B:
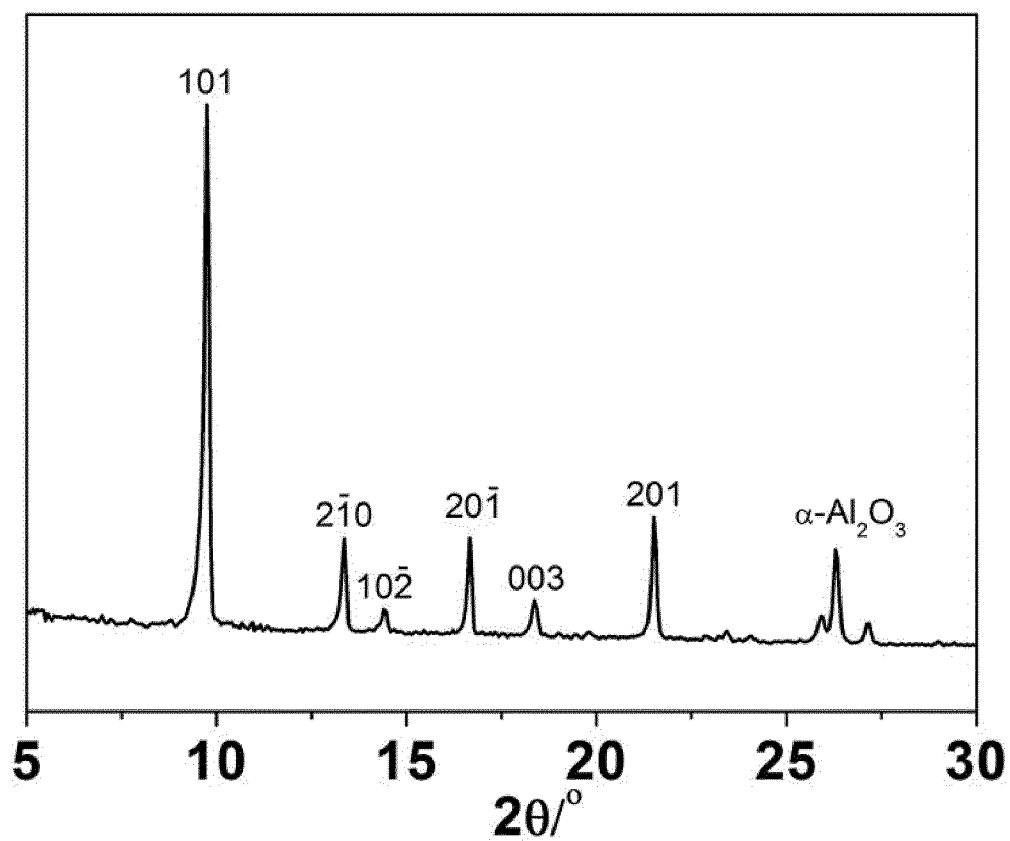
FIG. 12b. XRD pattern of the CHA membrane prepared according to the present invention as described in Example 13.

FIG. 12b shows the XRD pattern of the CHA membrane, prepared according to the present invention as described in Example 13, verifying the CHA structure. The reflections from the CHA film are indexed by the appropriate Miller indices, while the reflection from the alumina support is indexed with "$\alpha$-$Al_2O_3$".

Example 14

A porous $\alpha$-alumina disc substrate, as described in Example 1, was calcined in air at 500° C. for 6 hours. After filling the support with distilled water, the support was immersed in a solution containing one wt.-% of a cationic polymer (Poly(dimethylamine-co-epichlorhydrin-co-ethylenediamine) with an average molecular weight of 75000, from Aldrich) dissolved in aqueous ammonia (pH=10). After 10 minutes in the aqueous polymer solution, the support was rinsed in 0.1 M aqueous ammonia solution and subsequently, after drying in an oven for 2 hours at 105° C., the support was immersed into a 2.5 wt.-% ethanol solution of 1H, 1H, 2H, 2H-perfluorodecyltriethoxysilane for 1 hour. Thereafter, the support was dipped into ethanol (99.7%) four times after which the ethanol was replaced by new ethanol. This procedure was repeated six times. After drying in oven for 2 hours at 105° C., the support was immersed in an filtered (0.45 µm) aqueous dispersion of 0.5 wt.-% FAU crystals. The immersion time was 10 minutes. After the seeded support had been rinsed with filtered 0.1 M ammonia solution, it was immersed in a synthesis solution with the composition: 80 $Na_2O$: 1 $Al_2O_3$: 9 $SiO_2$: 5000 $H_2O$ and treated hydrothermally in an oil bath at 100° C. for 3 hours. After cooling, the sample was rinsed with 0.1 M aqueous $NH_3$ to remove loosely bound crystals from the synthesis solution attached on the surface of the membrane.

Figure 13A:
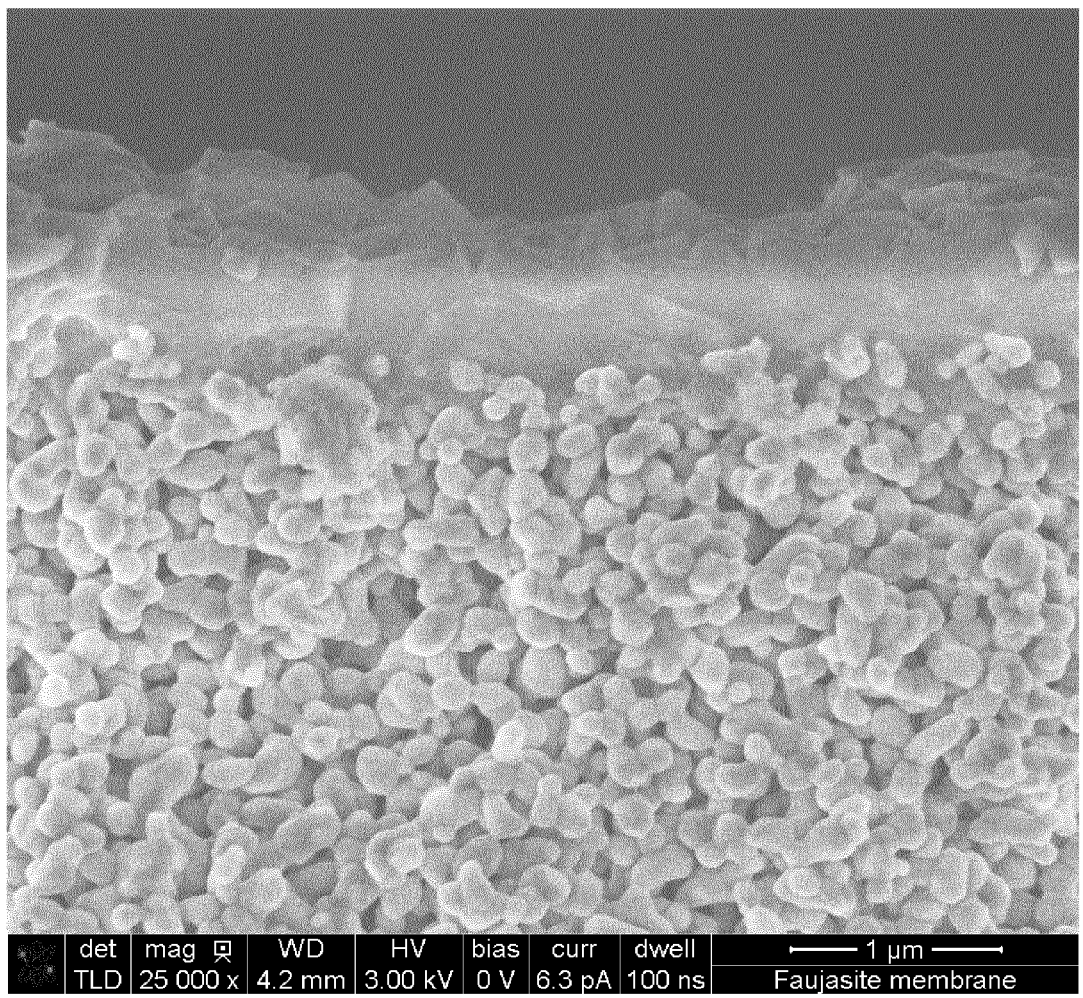
FIG. 13a. Scanning Electron Microscopy image of a cross section of a FAU membrane synthesized on the top layer of a porous α-alumina disc support, prepared according to the present invention as described in Example 14.
Figure 13B:
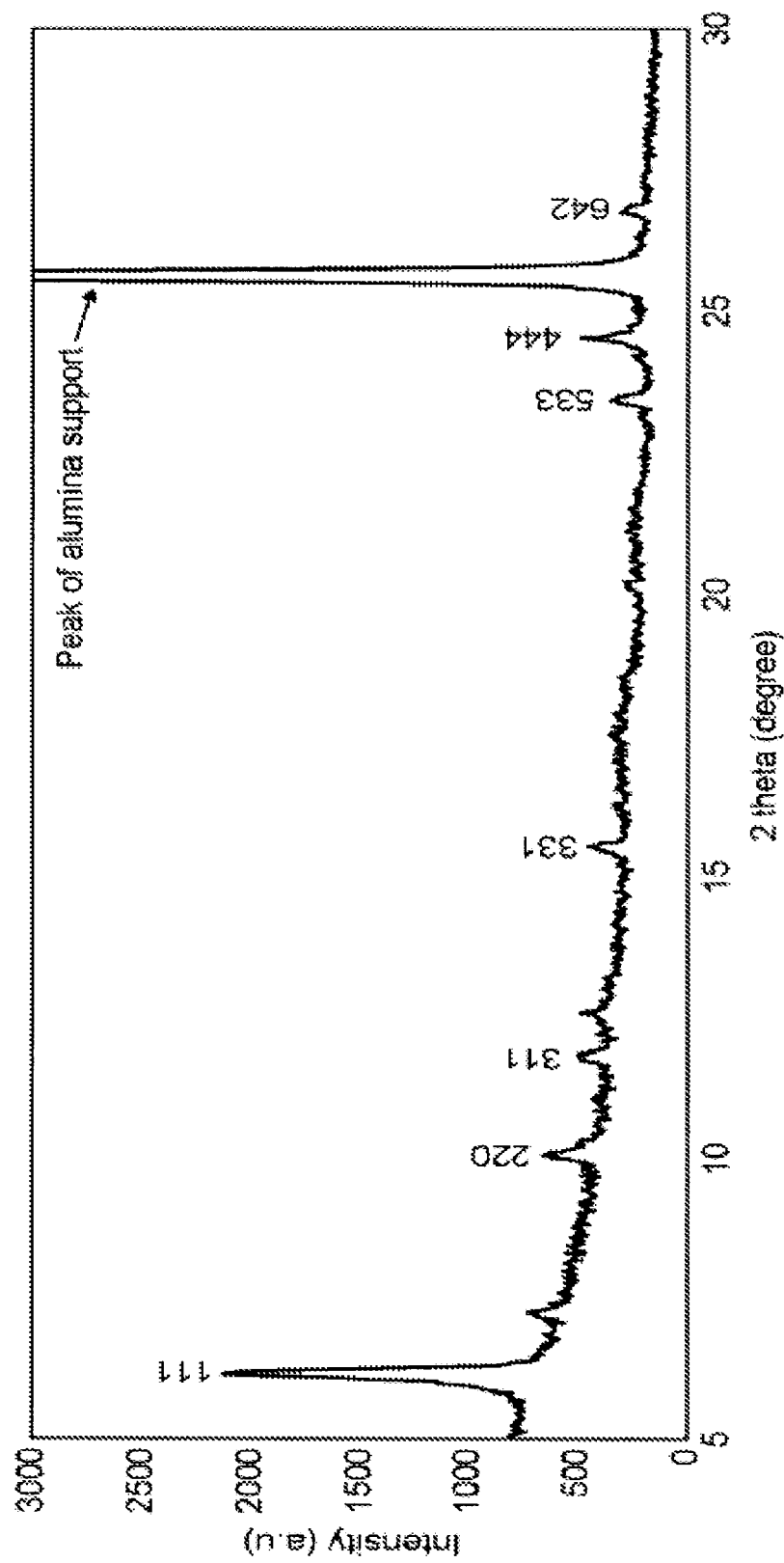
FIG. 13b. XRD pattern of the FAU membrane synthesized according to the present invention as described in Example 14. Reflection marked with an asterisk originate from the support.

A Scanning Electron Microscopy image of the cross section of the calcined FAU membrane showed that the pores of the support are fully open, and no zeolite invasion of the support could be detected by recording numerous SEM images at various locations of the cross section, implying that synthesis solution could not penetrate through the hydrophobic barrier of the support (FIG. 13a). FIG. 13b shows the XRD pattern of the FAU membrane, synthesized according to Example 14, verifying the FAU structure. Reflections marked with "#" emanates from the FAU structure, while the reflection marked with "*" originates from the porous $\alpha$-alumina support.

Example 15

A porous $\alpha$-alumina disc support, as described in Example 1, was calcined in air at 500° C. for 5 hours. After filling the support with distilled water, the support was immersed in a solution containing one wt.-% of a cationic polymer (Poly(dimethylamine-co-epichlorhydrin-co-ethylenediamine) with an average molecular weight of 75000, from Aldrich) dissolved in aqueous ammonia (pH=10). After 10 minutes in the aqueous polymer solution, the support was rinsed in 0.1 M aqueous ammonia solution and subsequently, after drying in oven for 2 hours at 105° C., the support was immersed into a 2.5 wt.-% ethanol solution of 1H, 1H, 2H, 2H-perfluoro decyltriethoxysilane for 1 hour. Thereafter, the support was dipped into ethanol (99.7%) four times after which the ethanol was replaced by new ethanol. This procedure was repeated six times. After drying in oven for 2 hours at 105° C., the support was immersed in an aqueous dispersion containing 1 wt.-% chabazite crystals with size between 20 and 300 nm according to dynamic light scattering. Deposition of the crystals onto the support surface was allowed to proceed for 10 minutes. After rinsing with a 0.1 M aqueous ammonia solution, the support was immersed in a synthesis solution with the molar composition of 1.0 $SiO_2$: 0.35 N, N, N-trimethyl-1-adamantyl ammonium fluoride: 160.0 $H_2O$ and hydrothermally treated in an oil bath at 160° C. for 36 hours. After cooling, the samples were rinsed with a filtered 0.1 M aqueous $NH_3$ solution to remove loosely bound crystals and oligomers from the surface of the membrane.

Figure 14:
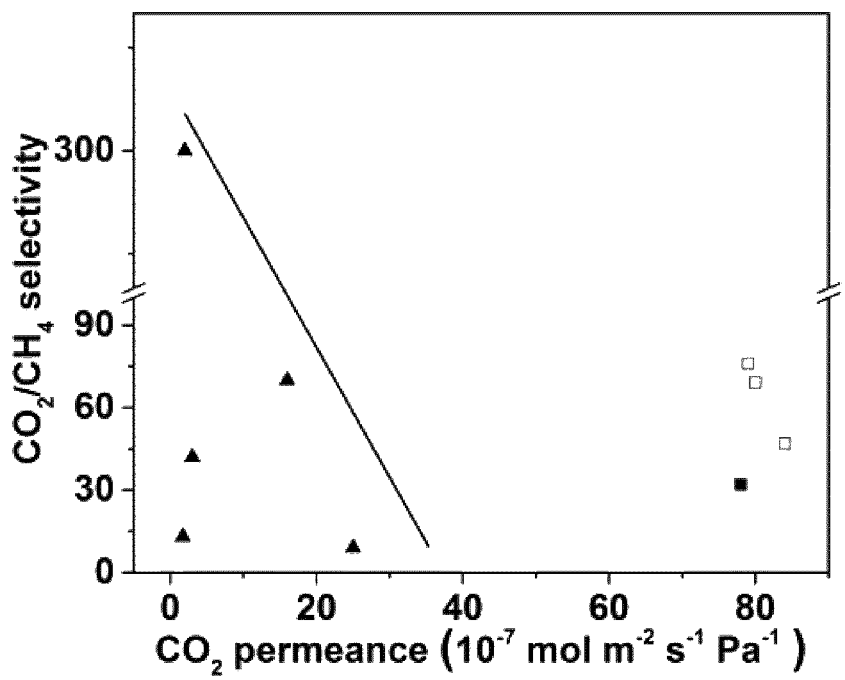
FIG. 14. Shows the best literature data reported for $CO_2/CH_4$ separation (filled triangles) and data for membranes prepared according to the present invention Example 15 indicated by squares, and FIG. 15. A plot of helium permeance vs. relative vapor pressure of n-hexane as measured in permporometry experiments, measured for the tubular MFI membrane described in Example 16.

An equimolar gas mixture of $CO_2$/$CH_4$ was separated by the CHA membrane at a feed pressure of 6-10 bar and a permeate pressure of 1-2 bar at a temperature from 253 to 320 K. Typical $CO_2$/$CH_4$ selectivity versus $CO_2$ permeance data recorded for the membrane prepared in Example 15 are shown by squares in FIG. 14. In FIG. 14, filled squares indicate room temperature separation data and open squares indicate separation data recorded at temperature below room temperature (253-263 K). FIG. 14 also shows the best separation data for SSZ-13 and SAPO-34 membranes (filled triangles) published in literature viz. from S. Li, J. L. Falconer and R. D. Noble, Microporous Mesoporous Mater., 2008, 110, 310-317; H. Kalipcilar, T. C. Bowen, R. D. Nobel and J. L. Falconer, Chem. Mater., 2002, 14, 3458-3464; N. Kosinov, C. Auffret, C. Gücüyener, B. M. Szyja, J. Gascon, F. Kapteijn and E. J. M. Hensen, J. Mater. Chem. A, 2014, 2, 13083; E. Kim, W. Cai, H. Baik and J. Choi, Angew. Chem. Int. Ed., 2013, 52, 5280-5284; Y. Tian, L. Fan, Z. Wang, S. Qui and G. Zhu, J. Mater. Chem., 2009, 19, 7698; R. Zhou, E. W. Ping, H. H. Funke, J. L. Falconer and R. D. Noble, J. Membr. Sci., 2013, 444, 384.

The combination of high permeance and high selectivity makes our membranes far more separation efficient than other inorganic membranes reported.

Example 16

A porous α-alumina tubular support according to Example 8 was prepared and seeded according to the method described in Example 8. After rinsing with 0.1 M aqueous ammonia solution, the support was immersed in a synthesis solution with the molar composition: 25 $SiO_2$: 3 TPAOH: 100 EtOH: 1450$H_2O$ and hydrothermally treated in an oil bath at 88° C. for 71 hours. After cooling, the MFI membrane was rinsed with filtered 0.1 M aqueous $NH_3$ to remove loosely bound crystals and oligomers from the surface of the membrane. The single gas helium permeance of the MFI membrane before calcination was lower than 0.02 verifying that the membrane was essentially free from cracks and pinholes.

Figure 15:
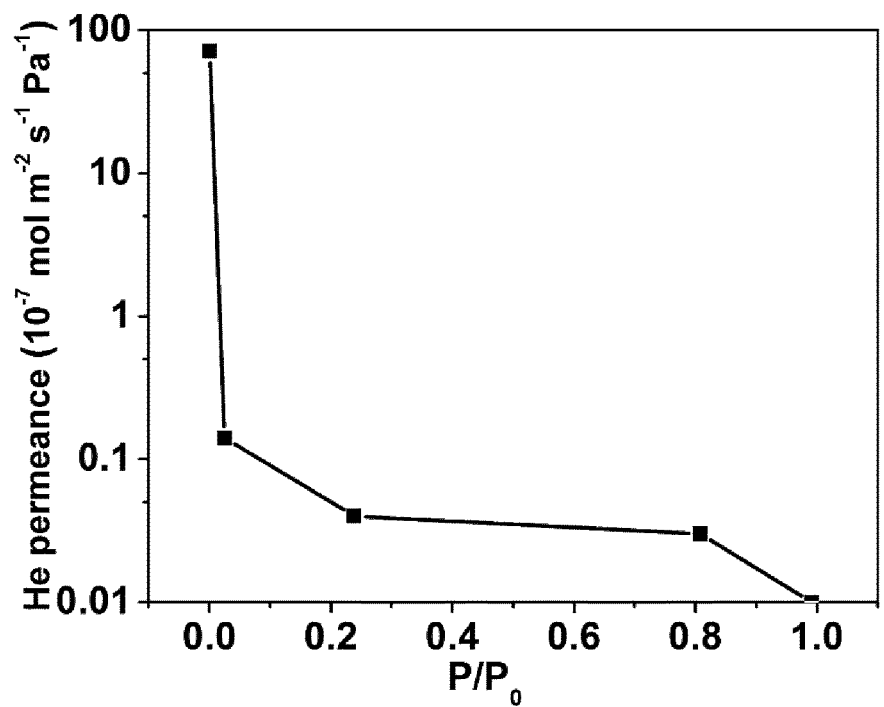

FIG. 15 shows a plot of helium permeance vs. relative vapor pressure of n-hexane as measured in a permporometry experiment of the MFI membrane prepared according to Example 16 is about 0.01 after calcination and a relative vapor pressure of 1, which is much lower than for a MFI membrane prepared according to prior art in Example 5.

An equimolar gas mixture of $CO_2/H_2$ was separated by the MFI membrane described in Example 16 at a feed pressure of 10 bar and a permeate pressure of 1 bar at room temperature. At a feed pressure of 10 bar, a $CO_2/H_2$ selectivity of 20 was measured and the $CO_2$ permeance was as high as 99. The high selectivity shows that the tubular membrane is essentially free from defects and the very high permeance shows that the membrane is very thin and permeable.

Throughout the description and claims of this specification, the words "comprise" and "contain" and variations of the words, for example "comprising" and "comprises", means "including but not limited to", and is not intended to (and does not) exclude other components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise. Features, integers, characteristics, compounds described in conjunction with a particular aspect, embodiment or example of the invention are to be understood to be applicable to any other aspect, embodiment or example described herein unless incompatible therewith.

All of the features disclosed in this specification (including any accompanying claims, abstract and drawings), and/or all of the steps of any method or process so disclosed, may be combined in any combination, except combinations where at least some of such features and/or steps are mutually exclusive. Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A method for producing a crystalline film comprising zeolite and/or zeolite-like crystals on a substrate or porous support, said method comprising the steps of:
   a) charge modifying a substrate or porous support,
   b) then rendering the charge modified substrate or porous support hydrophobic,
   c) depositing particulate zeolite and/or zeolite-like crystals onto the charge modified and hydrophobic substrate or porous support, and
   d) growing a crystalline film comprising zeolite and/or zeolite-like crystals from said deposited particulate zeolite and/or zeolite-like crystals to provide a crystalline film comprising zeolite and/or zeolite-like crystals on a substrate or porous support.

2. A method as claimed in claim 1, wherein the substrate or pororus support is impregnated with a solvent, a solution, or a combination thereof before charge modification of the support, wherein the solvent and/or solution comprises water, an alcohol, an aqueous ammonia solution, or a combination thereof.

3. A method as claimed in claim 1, wherein the charge modification is performed using one or more cationic materials.

4. A method as claimed in claim 3, wherein at least one cationic material of the one or more cationic materials is a cationic polymer.

5. A method as claimed in claim 4, wherein the substrate or porous support is immersed in a solution of cationic polymers.

6. A method according to claim 5, wherein the solution is an aqueous ammonia solution.

7. A method as claimed in claim 6, wherein the pH of the aqueous ammonia solution comprising cationic polymer(s) is from 7 to 12.

8. A method according to claim 1, wherein said substrate or porous support is made hydrophobic using hydrophobic agent(s) comprising one or more hydroxamate(s) and/or one or more silane(s).

9. A method according to claim 1, wherein said substrate or porous support is made hydrophobic using hydrophobic agent(s), wherein said hydrophobic agent(s) is/are selected from one or more of the following compound(s): octylhydroxamate, decylhydroxamate, dodecylhydroxamate, octadecyltrihydrosilane, phenyltrimethoxy silane, triethoxypropylsilane, 1H, 1H, 2H, 2H-perfluorodecyltriethoxysilane, 1H, 1H, 2H, 2H-perfluorodecyltrichlorosilane, trimethyloctylsilane, octyltrimethoxysilane, 1H, 1H, 2H,2H-perfluorocetylmethyldichlorosilane, 1H, 1H, 2H, 2H-perfluorooctyltrimethoxysilane, or a combination thereof.

10. A method according to claim 8, wherein the zeolite material is selected from the group consisting of silicalite-1, zeolite A, zeolite Beta, the zeolites L, Y, X, ZSM-22, ZSM-11, ZSM-5, ZSM-2, LTA, SAPO-34, DDR, mordenite, chabazite, faujasite, sodalite, ferrierite, MFI, and phillipsite.

11. A method according to claim 1, wherein in step a) the porous support is asymmetric comprising a top layer and the top layer is charge modified.

12. A method according to claim 1, wherein a top surface of the substrate or porous support is charge modified.

13. A method according to claim 1, wherein the product of steps (a) to (c) is used in subsequent steps of the method without calcination.

* * * * *